United States Patent
Torabian Esfahani et al.

(10) Patent No.: US 12,507,063 B2
(45) Date of Patent: Dec. 23, 2025

(54) SOURCE NETWORK NODE, TARGET NETWORK NODE, AND METHODS IN A WIRELESS COMMUNICATIONS NETWORK

(71) Applicant: Telefonaktiebolaget LM Ericsson (publ), Stockholm (SE)

(72) Inventors: Tahmineh Torabian Esfahani, Sollentuna (SE); Icaro L.J. Da Silva, Solna (SE); Luca Lunardi, Genoa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 369 days.

(21) Appl. No.: 18/043,222

(22) PCT Filed: Sep. 9, 2020

(86) PCT No.: PCT/SE2020/050847
§ 371 (c)(1),
(2) Date: Feb. 27, 2023

(87) PCT Pub. No.: WO2022/055402
PCT Pub. Date: Mar. 17, 2022

(65) Prior Publication Data
US 2024/0015503 A1     Jan. 11, 2024

(51) Int. Cl.
*H04W 12/00* (2021.01)
*H04W 12/02* (2009.01)
(Continued)

(52) U.S. Cl.
CPC ........... *H04W 12/02* (2013.01); *H04W 12/03* (2021.01); *H04W 12/0431* (2021.01)

(58) Field of Classification Search
CPC . H04W 12/02; H04W 12/0431; H04W 12/03; H04W 455/41
See application file for complete search history.

(56) References Cited

U.S. PATENT DOCUMENTS

2011/0256868 A1* 10/2011 Nogami ................ H04L 5/0048
455/435.1
2019/0223063 A1* 7/2019 Palanigounder .... H04W 60/005
(Continued)

FOREIGN PATENT DOCUMENTS

WO     2018230980 A1     12/2018
WO     2019032444 A1     2/2019
(Continued)

OTHER PUBLICATIONS

International Search Report and Written Opinion dated May 6, 2021 for International Application No. PCT/SE2020/050847 filed Sep. 9, 2020 consisting of 11 pages.
(Continued)

*Primary Examiner* — Khai M Nguyen
(74) *Attorney, Agent, or Firm* — Weisberg I.P. Law, P.A.

(57) ABSTRACT

A method performed by a source network node, for preventing agents from illegitimately identifying the source network node when resuming a wireless terminal in a target network node in a wireless communications network is provided. The source network node obtains a concealing key, which concealing key is shared with the target network node. The source network conceals a resume identifier with the obtained concealing key, which resume identifier identifies the source network node. When releasing the wireless terminal, the source network node sends the concealed resume identifier to the wireless terminal, which concealed resume identifier is to be sent by the wireless terminal to the target network node upon requesting resumption of the wireless terminal, wherein the resume identifier is only identifiable from the concealed resume identifier by using the shared concealing key, thereby preventing agents from illegitimately learning the source network node identity.

20 Claims, 13 Drawing Sheets

(51) Int. Cl.
*H04W 12/03* (2021.01)
*H04W 12/0431* (2021.01)

(56) References Cited

U.S. PATENT DOCUMENTS

2020/0015074 A1    1/2020  Kim et al.
2020/0092771 A1*   3/2020  Ohlsson ............ H04W 36/0079

FOREIGN PATENT DOCUMENTS

WO     WO-2019097458 A1 *  5/2019   ............ H04W 76/18
WO         2020165843 A1    8/2020

OTHER PUBLICATIONS

3GPP TS33.401 V15.1.0; 3rd Generation Partnership Project; Technical Specification Group Services and System Aspects; 3GPP System Architecture Evolution (SAE); Security architecture (Release 15); Sep. 2017, consisting of 17 pages.
European Search Report dated May 7, 2024 for Application No. 20953454.4, consisting of 8 pages.
3GPP TS 38.331 V15.8.0; 3rd Generation Partnership Project; Technical Specification Group Radio Access Network; NR; Radio Resource Control (RRC) protocol specification (Release 15); Dec. 2019; consisting of 398 pages.
3GPP TS 38.300 V16.0.0; 3rd Generation Partnership Project; Technical Specification Group Radio Access Network; NR; NR and NG-RAN Overall Description; Stage 2 (Release 16); Dec. 2019; consisting of 101 pages.

\* cited by examiner

US 12,507,063 B2

SOURCE NETWORK NODE, TARGET NETWORK NODE, AND METHODS IN A WIRELESS COMMUNICATIONS NETWORK

CROSS-REFERENCE TO RELATED APPLICATION

This application is a Submission Under 35 U.S.C. § 371 for U.S. National Stage Patent Application of International Application Number: PCT/SE2020/050847, filed Sep. 9, 2020 entitled "SOURCE AND TARGET NETWORK NODES AND METHODS THEREIN FOR PREVENTING AGENTS FROM ILLEGITIMATELY IDENTIFYING THE SOURCE NETWORK NODE WHEN RESUMING A WIRELESS TERMINAL IN A TARGET NETWORK NODE IN A WIRELESS COMMUNICATIONS NETWORK," the entirety of which is incorporated herein by reference.

TECHNICAL FIELD

Embodiments herein relate to a source network node, a target network node and methods therein. In some aspects, they relate to preventing agents from illegitimately identifying the source network node when resuming a wireless terminal in a target network node in a wireless communications network.

BACKGROUND

In a typical wireless communication network, wireless devices, also known as wireless communication devices, wireless terminals, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Tracking Connection of Wireless Terminals

For NR Radio Access, in order for a network node e.g. gNB to track a connection state of an associated wireless terminal, 3GPP has defined three Radio Resource Control (RRC) states for a wireless terminal state machine, namely the states: RRC_IDLE, RRC_CONNECTED and RRC_INACTIVE. The wireless terminal state machine and state transition in NR are shown in FIG. 1.

Provided that radio bearers, e.g. Signaling Radio Bearer 2 (SRB2) and at least one Dedicated Radio Bearer (DRB) are setup for the wireless terminal.

The state transition from RRC_CONNECTED to RRC_INACTIVE illustrated in FIG. 1 may be triggered when a source network node initiates an RRC connection release procedure and sends to the wireless terminal e.g. an RRC release message which includes suspending the established radio bearers, e.g. SRB2 and the at least one DRB.

The state transition from RRC_INACTIVE to RRC_CONNECTED illustrated in FIG. 1 may be initiated by a resumption of a connection. The resumption may be a resume procedure, e.g. a RRC connection resume, initiated by the wireless terminal. The resume procedure may be triggered for multiple reasons, and e.g. may be preceded by paging, for Non-Access Stratum (NAS) signaling or due to a need to transfer data towards the wireless terminal in downlink.

The wireless terminal may start a resume procedure by sending a resume request e.g. an RRC resume request on logical channel Common Control Channel (CCCH) or an RRC resume request 1 on logical channel Common Control Channel 1 (CCCH1). The channel used for the resume procedure is based on the absence or presence of a useFullResumeID Information Element (IE) in a System Information Block 1 (SIB1) of the serving NR cell wherein the CCCH1 may be used when the useFullResumeID is set, and CCCH may be used when the useFullResumeID is not set The wireless terminal may further attempt to resume a connection towards an NR cell controlled by the same source network node or a different target network node. In some scenarios the source network node and target network nodes may have an established connection, e.g. an Xn connection, between them. In some scenarios, the source network node and target network node may not have an established connection between them.

SIB1 Structure

SIB1 contains information relevant when evaluating if a UE is allowed to access a cell and defines the scheduling of other system information. It also contains radio resource configuration information that is common for all UEs and barring information applied to the unified access control.

For resumption and releasing of the wireless terminals from a source network node to a target network node, the relevant parts provided in SIB1 may be:
  cellAccessRelatedInfo: comprising information related to RAN Notification Area (RNA), i.e. trackingAreaCode, RAN Area Code (RANAC), and cellIdentity.
  useFullResumeID: if absent, it indicates to the wireless terminal to use fullI-RNTI and RRC Resume Request. If present, it indicates to the wireless terminal to use shortI-RNTI and RRC Resume Request 1.

SIB1 Message Structure

A SIB1 message may be of the following structure and may comprise the following information.

```
-- ASN1START
-- TAG-SIB1-START
SIB1 ::= SEQUENCE {
   cellSelectionInfo              SEQUENCE {
      q-RxLevMin                  Q-RxLevMin,
      q-RxLevMinOffset            INTEGER (1..8)              OPTIONAL,    -- Need S
      q-RxLevMinSUL               Q-RxLevMin                  OPTIONAL,    -- Need R
      q-QualMin                   Q-QualMin                   OPTIONAL,    -- Need S
      q-QualMinOffset             INTEGER (1..8)              OPTIONAL     -- Need S
   }                                                          OPTIONAL, -- Cond Standalone
   cellAccessRelatedInfo          CellAccessRelatedInfo,
   connEstFailureControl          ConnEstFailureControl       OPTIONAL,    -- Need R
   si-SchedulingInfo              SI-SchedulingInfo           OPTIONAL,    -- Need R
   servingCellConfigCommon        ServingCellConfigCommonSIB  OPTIONAL,    -- Need R
   ims-EmergencySupport           ENUMERATED (true)           OPTIONAL,    -- Need R
   eCallOverIMS-Support           ENUMERATED (true)           OPTIONAL,    -- Cond Absent
   ue-TimersAndConstants          VE-TimersAndConstants       OPTIONAL,    -- Need R
   uac-BarringInfo                SEQUENCE {
      uac-BarringForCommon        UAC-BarringPerCatList       OPTIONAL,    -- Need S
      uac-BarringPerPLMN-List     UAC-BarringPerPLMN-List     OPTIONAL,    -- Need S
      uac-BarringInfoSetList      UAC-Barring InfoSetList,
      uac-AccessCategory1-SelectionAssistanceInfo  CHOICE {
         plmnCommon               UAC-AccessCategory1-SelectionAssistanceInfo,
         individualPLMNList       SEQUENCE (SIZE (2..maxPLMN)) OF UAC-AccessCategory1-
SelectionAssistanceInfo
      }                           OPTIONAL -- Need S
   }                              OPTIONAL, -- Need R
   useFullResumeID                ENUMERATED { true) OPTIONAL,             -- Need N
   lateNonCriticalExtension       OCTET STRING OPTIONAL,
   nonCriticalExtension           SEQUENCE () OPTIONAL
}
UAC-AccessCategory1-SelectionAssistanceInfo ::= ENUMERATED (a, b, c)|
-- TAG-SIBL-STOP
-- ASNISTOP
```

CellAccessRelatedInfo Structure

The CellAccessRelatedInfo part of above SIB1 message may e.g. comprise below data.

```
-- ASNISTART
-- TAG-CELLACCESSRELATEDINFO-START
CellAccessRelatedInfo                  SEQUENCE {
   plmn-Identitylist                   PLMN-IdentityInfolist,
   cellReservedForOtherUse             ENUMERATED (true) OPTIONAL,   -- Need R
   ...
}
-- TAG-CELLACCESSRELATEDINFO-STOP
-- ASNISTOP
```

PLMN-IdentityInfoList

The PLMN-IdentityInfoList part of above CellAccessRelatedInfo may e.g. comprise below data.

```
-- ASN1START
-- TAG-PLMN-IDENTITYINFOLIST-START
PLMN-IdentityInfoList ::=              SEQUENCE (SIZE (1..maxPLMN)) OF PLMN-IdentityInfo PLMN-IdentityInfo ::= .                SEQUENCE { plmn-IdentityList                   SEQUENCE (SIZE (1..maxPLMN)) OF PLMN-Identity, trackingAreaCode                    TrackingAreaCode OPTIONAL, -- Need R ranac                               RAN-AreaCode OPTIONAL, -- Need R cellIdentity                        CellIdentity, cellReservedForOperatorUse          ENUMERATED (reserved, notReserved},

...

}
-- TAG-PLMN-IDENTITYINFOLIST-STOP
-- ASN1STOP
```

RRC Release

To transition a wireless terminal to NR RRC_INACTIVE, a source network node may prepare and send to the wireless terminal an RRC release message which may include a suspendConfig comprising an Inactive Radio Network Temporary Identifier (I-RNTI) and an indication for the wireless terminal to suspend.

A suspendConfig Information Element within RRC release message may comprise:

A fullI-RNTI, used to identify the suspended UE context of a wireless terminal in RRC_INACTIVE using a 40 bit I-RNTI, a shortI-RNTI, used to identify the suspended UE context of a wireless terminal in RRC_INACTIVE using a 24 bits I-RNTI, or a RAN-Notification Area Info, used for RNA configuration.

A RAN Notification Area Info may comprise one of the following:

1. a cellList, of type PLMN-RAN-AreaCellList
2. a ran-AreaConfigList, of type PLMN-RAN-AreaConfigList The content of PLMN-RAN-AreaCellList and PLMN-RAN-AreaConfigList is detailed below in the structure of RRC Release message (ref. 3GPP TS 38.331)

RRC Release Message Structure

An RRC release message may be of the following structure and may comprise the following information.

```
-- ASN1START
-- TAG-RRCRELEASE-START
RRCRelease ::=                       SEQUENCE {
    rrc-TransactionIdentifier            RRC-TransactionIdentifier,
    criticalExtensions                   CHOICE {
        rrcRelease                           RRCRelease-IEs,
        criticalExtensionsFuture             SEQUENCE {}
    }
}
RRCRelease-IEs ::=                   SEQUENCE {
    redirectedCarrierInfo                RedirectedCarrierInfo OPTIONAL, -- Need N
    cellReselectionPriorities            CellReselectionPriorities OPTIONAL, -- Need R
    suspendConfig                        SuspendConfig OPTIONAL, -- Need R
    deprioritisationReq                  SEQUENCE {
        deprioritisationType                 ENUMERATED (frequency, nr),
        deprioritisationTimer                ENUMERATED (min5, min10, min15, min30)
    }                                        OPTIONAL, -- Need N
    lateNonCriticalExtension             OCTET STRING OPTIONAL,
    nonCriticalExtension                 RRCRelease-v1540-IEs OPTIONAL
}
RRCRelease-v1540-IEs ::=             SEQUENCE {
    waitTime                             RejectWaitTime OPTIONAL, -- Need N
    nonCriticalExtension                 SEQUENCE {} OPTIONAL
}
RedirectedCarrierInfo ::=            CHOICE {
    nr                                   CarrierInfoNR,
    eutra                                RedirectedCarrierInfo-BUTRA,
    ...
}
RedirectedCarrierInfo-EUTRA ::=      SEQUENCE {
    eutraFrequency                       ARFCN-ValueEUTRA,
    cnType                               ENUMERATED (epc, fiveGC) OPTIONAL -- Need N
}
CarrierInfoNR ::=                    SEQUENCE (
    carrierFreq                          ARFCN-ValueNR,
    ssbSubcarrierSpacing                 Subcarrierspacing,
    smtc                                 SSB-MTC OPTIONAL, -- Need S
    ...
}
SuspendConfig ::=                    SEQUENCE {
    fullI-RNTI                           I-RNTI-Value,
    shortI-RNTI                          ShortI-RNTI-Value,
    ran-PagingCycle                      PagingCycle,
    ran-NotificationAreaInfo             RAN-NotificationAreaInfo OPTIONAL, -- Need M
    t380                                 PeriodicRNAU-TimerValue OPTIONAL, -- Need R
    nextHopChainingCount                 NextHopChainingCount,
    ...
}
PeriodicRNAU-TimerValue ::=          ENUMERATED ( min5, min10, min20, min30, min60, min120,
min360, min720)
CellReselectionPriorities ::=        SEQUENCE {
    freqPriorityListBUTRA                FreqPriorityListEUTRA OPTIONAL, -- Need M
    freqPriorityListNR                   FreqPriorityListNR OPTIONAL, -- Need M
    t320                                 ENUMERATED (min5, min10, min20, min30, min60, min120,
min180, spare1) OPTIONAL, -- Need R
    ...
}
PagingCycle ::=                      ENUMERATED (rf32, rf64, rf128, rf256]
FreqPriorityListEUTRA ::=            SEQUENCE (SIZE (1..maxFreq)) OF FreqPriorityEUTRA
FreqPriorityListNR ::=               SEQUENCE (SIZE (1..maxFreq)) OF FreqPriorityNR
FreqPriorityEUTRA ::=                SEQUENCE {
    carrierFreq                              ARFCN-ValueEUTRA,
```

```
    cellReselectionPriority            CellReselectionPriority,
    cellReselectionSubPriority         CellReselectionSubPriority OPTIONAL -- Need R
}
FreqPriorityNR ::=                SEQUENCE {
    carrierFreq                        ARFCN-ValueNR,
    cellReselectionPriority            CellReselectionPriority,
    cellReselectionSubPriority         CellReselectionSubPriority OPTIONAL -- Need R
}
RAN-NotificationAreaInfo ::=      CHOICE {
    cellList                           PLMN-RAN-AreaCellList,
    ran-AreaConfigList                 PLMN-RAN-AreaConfigList,
    ...
}
PLMN-RAN-AreaCelllist ::=         SEQUENCE (SIZE (1..maxPLMNIdentities)) OF PLMN-RAN-AreaCell
PLMN-RAN-AreaCell ::=                SEQUENCE |
    plmn-Identity                         PLMN-Identity OPTIONAL, -- Need S
    ran-AreaCells                         SEQUENCE (SIZE (1..32)) OF CellIdentity
}
PLMN-RAN-AreaConfigList ::=       SEQUENCE (SIZE (1..maxPLMNIdentities)) OF PLMN-RAN-AreaConfig
PLMN-RAN-AreaConfig ::=           SEQUENCE (
    plmn-Identity                      PLMN-Identity OPTIONAL, -- Need S
    ran-Area                           SEQUENCE (SIZE (1..16)) OF RAN-AreaConfig
}
RAN-AreaConfig ::=                   SEQUENCE {
    trackingAreaCode                   TrackingAreaCode,
    ran-AreaCodeList                   SEQUENCE (SIZE (1..32)) OF RAN-AreaCode OPTIONAL -- Need R
}
-- TAG-RRCRELEASE-STOP
-- ASN1STOP
```

RRC Connection Resume

Resuming a suspended RRC connection for an inactive wireless terminal may include resuming bearers SRB and DRB, or performing an RNA update. When the suspended RRC connection is resumed, the target network node may configure the inactive wireless terminal according to the RRC connection resume procedure based on the stored inactive UE context such as e.g. Access Stratum (AS) UE context. The RRC connection resume procedure may re-activate AS security and re-establish bearers such as e.g. SRB and DRB.

New Cell Selection

Whenever a wireless terminal in RRC_INACTIVE reselects a new cell, e.g. a different cell controlled by a different target network node, i.e. a network node other than the source network node that released the wireless terminal to RRC_INACTIVE, the wireless terminal may check whether the new cell that is the target belong to the configured RNA. This may be performed by checking the SIB1 broadcasted by the target cell. If the new cell is comprised in the RNA, the wireless terminal may remain in RRC_INACTIVE without performing any signaling between the wireless terminal and the target network node. The target network node may not need to contact the source network node, as long as the wireless terminal remains within the RNA.

However, if the wireless terminal reselects a new NR cell that is not comprised in the RNA configuration of the wireless terminal, the wireless terminal may initiate an RRC connection resume. This may be performed by the wireless terminal by sending to the target network node an RRC resume request, e.g. comprising a shortI-RNTI, or an RRC resume request 1, e.g. comprising a fullI-RNTI. Different values for ResumeCause may be used in the Resume request, such as RNA-Update.

A target network node may then fetch a stored UE context from a source network node, and decide upon receiving the UE context of the resume request message whether to maintain the wireless terminal in RRC_CONNECTED, release the wireless terminal to RRC_INACTIVE with an updated configuration, or to release the wireless terminal to RRC_IDLE. In some scenarios, other options may also be possible e.g. as the target network node may reject the wireless terminal with a wait time due to overload in the NG-RAN.

When the wireless terminal accesses a target network node other than a last serving network node, e.g. the source network node, which transitioned the wireless terminal to RRC_INACTIVE, the target network node may trigger an Xn Application Protocol (XnAP) Retrieve UE Context procedure to retrieve the UE context from the last serving network node. The target network node may then determine the last source network node serving the UE, the last source network node holding the UE context of the wireless terminal by examining the wireless terminal's resume identity, e.g. I-RNTI, presented by the wireless terminal during the resume procedure e.g. as disclosed further in 3GPP TS 38.300 clause 9.2.2.4.

FIG. 2 illustrates a scenario comprising a UE Triggered transition from RRC_INACTIVE to RRC_CONNECTED, UE context retrieval failure. In the scenario of FIG. 2, the wireless terminal is initially in the RRC state RRC_INACTIVE. The wireless terminal then accesses a receiving network node other than the last serving node, e.g. the source network node, by sending 201 an RRC Resume Request. The receiving node may then send 202 a Retrieve UE Context Request to the last serving node. The last serving node may then fail 203 to retrieve or to verify the UE context. The last serving node may then send 204 a Retrieve UE Context Failure to the receiving network node. The receiving network node may then sending 205 an RRC Setup to the wireless terminal. Thus the wireless terminal establishes 206 of a new RRC connection instead of resuming of the previous RRC connection and transitions to RRC state RRC_CONNECTED.

A wireless terminal in the RRC_INACTIVE state may be required to initiate an RNA update procedure when it relocates out of the currently configured RNA. When the network node receives the RNA update request from the wireless terminal, the receiving network node may trigger an XnAP Retrieve UE Context procedure to get the UE Context from the last serving network node, and may, e.g. based on the result of the XnAP Retrieve UE Context procedure, decide to transition the wireless terminal state into any of RRC_INACTIVE, RRC_CONNECTED, or RRC_IDLE. In case of a periodic RNA update, the last serving network node, may decide to not relocate the UE context. Hence, the XnAP Retrieve UE Context procedure may fail and the receiving network node may transition the wireless terminal back to RRC_INACTIVE.

XnAP Retrieve UE Context Request

This message is sent by the new target NG-RAN network node to request the old source NG-RAN network node to transfer the UE Context to the new target NG-RAN network node. Direction: From new target NG-RAN network node to the old source NG-RAN network node. The content of the message is exemplified below in Table 1.

TABLE 1

Example message of an XnAP retrieve UE context request from the target network node to the source network node.

| IE/Group Name | Presence | IE type and reference | Semantics description | Criticality | Assigned Criticality |
|---|---|---|---|---|---|
| Message Type | M | 9.2.3.1 | | YES | reject |
| New NG-RAN node UE XnAP ID reference | M | NG-RAN node UE XnAP ID 9.2.3.16 | Allocated at the new NG-RAN node | YES | reject |
| UE Context ID | M | 9.2.3.40 | | YES | reject |
| Integrity protection | M | BIT STRING (SIZE (16)) | RRC Resume: ResumeMAC-I either contained in the RRC ResumeRequest or the RRCResumeRequest1 message as defined in TS 38.331 [10]) or the ShortResumeMAC-I in the RRCConnection ResumeRequest message as defined in TS 36.331 [14]) RRC Reestablishment: ShortMAC-I contained in the RRCReestablishmentRequest as defined in TS 38.331 [10]) or the ShortMAC-I in the RRCConnection ReestablishmentRequest message as defined in TS 36.331 [14]). | YES | reject |
| New Cell Identifier | M | NG-RAN Cell Identity 9.2.2.9 | RRC Resume: Corresponds to the targetCellIdentity within the VarResumeMAC-Input as specified in TS 38.331 [10] or the cellIdentity within the VarShortINACTIVE-MAC Input as specified in TS 36.331 [14]. RRC Reestablishment: Corresponds to the targetCellIdentity within the VarShortMAC-Input as specified in TS 38.331 [10] or the cellIdentity within the VarShortMAC-Input as specified in TS 36.331 [14]. | YES | Reject |
| RRC Resume Cause | O | 9.2.3.61 | In case of RNA Update, contains the cause value provided by the UE in the RRC ResumeRequest or the RRCResumeRequest message, as defined in TS 38.331 [10], or in the RRCConnection ResumeRequest message, as defined in TS 36.331 [14]. | YES | Ignore |

XnAP Retrieve UE Context Response

This message is sent by the old source NG-RAN network node to transfer the UE context to the new target NG-RAN network node. Direction: From the old source NG-RAN network node to the new target NG-RAN network node. The content of the message is exemplified below in Table 2.

TABLE 2

Example message for UE context transfer to the target network node from the source network node.

| IE/Group Name | Presence | IE type and reference | Semantics description | Criticality | Assigned Criticality |
|---|---|---|---|---|---|
| Message Type | M | 9.2.3.1 | | YES | reject |
| New NG-RAN node UE XnAP ID reference | M | NG-RAN node UE XnAP ID 9.2.3.16 | Allocated at the new NG-RAN node | YES | ignore |

TABLE 2-continued

Example message for UE context transfer to the target network node from the source network node.

| IE/Group Name | Presence | IE type and reference | Semantics description | Criticality | Assigned Criticality |
|---|---|---|---|---|---|
| Old NG-RAN node UE XnAP ID reference | M | NG-RAN node UE XnAP ID 9.2.3.16 | Allocated at the old NG-RAN node | YES | ignore |
| GUAMI | M | 9.2.3.24 | | YES | reject |
| UE Context Information Retrieve UE Context Response | M | 9.2.1.13 | | YES | reject |
| Trace Activation | O | 9.2.3.55 | | YES | ignore |
| Masked IMEISV | O | 9.2.3.32 | | YES | ignore |
| Location Reporting Information | O | 9.2.3.47 | Includes the necessary parameters for location reporting. | YES | ignore |
| Criticality Diagnostics | O | 9.2.3.3 | | YES | ignore |

SUMMARY

As a part of developing embodiments herein a problem was identified by the inventors and will first be discussed.

A problem may arise when e.g. a malicious wireless terminal intercepts one or more resume identifiers, e.g. an I-RNTI, and sends a forged resume request, e.g. RRC Resume Request or RRC Resume Request 1, to a network node based on the intercepted resume identifiers. This may be possible as wireless terminals may be static or semi-static and may suspend and resume in the same serving cell of the same network node. In this way e.g. the bits used to encode a source network node identity in the I-RNTI may be the same. Hence, it may thus be possible to analyze an intercepted resume identifier and the source network node identity may be revealed. The malicious wireless terminal may then be able to force failures to find the UE context by sending a forged resume request e.g. comprising a forged I-RNTI. Furthermore, as illustrated in FIG. 2, upon failing to retrieve the UE Context, a receiving network node, may perform a fallback to establish a new RRC connection by sending an RRC Setup towards the malicious wireless terminal. Thus, the malicious wireless terminal may be able to force unnecessary signaling and thereby may exhaust network resources.

An object of embodiments herein is thus to provide a more secure way of resuming a wireless terminal in the target network node released from a source network node in a wireless communications network.

According to an aspect of embodiments herein, the object is achieved by a method performed by a source network node, for preventing agents from illegitimately identifying the source network node when resuming a wireless terminal in a target network node in a wireless communications network. The source network node obtains a concealing key. The concealing key is shared with the target network node. The source network node then conceals a resume identifier with the obtained concealing key. The resume identifier identifies the source network node. When releasing the wireless terminal the source network node sends the concealed resume identifier to the wireless terminal. The concealed resume identifier is to be sent by the wireless terminal to the target network node upon requesting resumption of the wireless terminal. The resume identifier is only identifiable from the concealed resume identifier by using the shared concealing key, thereby preventing agents from illegitimately learning the source network node identity.

According to another aspect of embodiments herein, the object is achieved by a method performed by a target network node, for preventing agents from illegitimately identifying the source network node when resuming a wireless terminal in the target network node in a wireless communications network. The target network node obtains a concealing key. The concealing key is shared with the source network node. The target network node receives from the wireless terminal, a resume request and a concealed resume identifier. The concealed resume identifier is a resume identifier concealed by the source network node using the shared concealing key. The resume identifier identifies the source network node. The resume identifier is only identifiable from the concealed resume identifier by using the shared concealing key, thereby preventing agents from illegitimately learning the source network node identity when resuming the wireless terminal in the target network node. The target network node then identifies the source network node by decoding the concealed resume identifier with the shared concealing key and resumes the wireless terminal in the target network node by using the identity of the source network node.

According to another aspect of embodiments herein, the object is achieved by a source network node configured to prevent agents from illegitimately identifying the source network node when resuming a wireless terminal in a target network node in a wireless communications network, wherein the source network node further is configured to:

Obtain a concealing key, which concealing key is adapted to be shared with the target network node, conceal a resume identifier with the obtained concealing key, which resume identifier is adapted to identify the source network node, and when releasing the wireless terminal, the source network node is configured to send the concealed resume identifier to the wireless terminal, which concealed resume identifier is to be sent by the wireless terminal to the target network node upon requesting resumption of the wireless terminal, wherein the resume identifier is adapted to only be identifiable from the concealed resume identifier by using the shared concealing key, thereby preventing agents from illegitimately learning the source network node identity.

According to another aspect of embodiments herein, the object is achieved by a target network node configured to prevent agents from illegitimately identifying the source network node when resuming a wireless terminal in the target network node in a wireless communications network, wherein the target network node is further configured to:

Obtain a concealing key, which concealing key is adapted to be shared with the source network node, receive from the wireless terminal, a resume request and a concealed resume identifier, which concealed resume identifier is adapted to be a resume identifier concealed by the source network node using the shared concealing key, and which resume identifier is adapted to identify the source network node, wherein the resume identifier is adapted to only be identifiable from the concealed resume identifier by using the shared concealing key, thereby preventing agents from illegitimately learning the source network node identity when resuming the wireless terminal in the target network node, identify the source network node by decoding the concealed resume identifier with the shared concealing key, and resume the wireless terminal in the target network node by using the identity of the source network node.

Since the source network node shares the concealing key with the target network node, the source network node may conceal the resume identifier identifying the source network node identity. Hence, in this way, it is possible to release the wireless terminal and send the concealed resume identifier which can only, by use of the shared concealing key, identify the resume identifier. Thus, the wireless terminal is enabled to further request resumption in a target network node and send the concealed resume identifier such that the target network node may be able to identify the source network node identity with use of the shared concealing key and the concealed resume identifier. This results in a more secure way of resuming a wireless terminal in the target network node released from a source network node in a wireless communications network.

Thanks to these above features, the wireless terminal is thus enabled to resume a connection in the target network node without any other illegitimately learning the source network node identity.

BRIEF DESCRIPTION OF THE DRAWINGS

Examples of embodiments herein are described in more detail with reference to attached drawings in which.

DETAILED DESCRIPTION

Embodiments herein e.g. provide a secure way of managing secure connections, protecting network nodes from malicious users learning their identity. Some embodiments herein may more specifically relate to managing inactive RRC connections by a secured I-RNTI.

Some examples of embodiments herein relate to securely deliver a resume identifier from a source network node via a wireless terminal to a target network node by means of concealing the resume identifier such that the resume identifier may not be retrieved by any malicious third party devices. During a release request, a resume identifier, e.g. an I-RNTI, may be sent concealed from a source network node via a wireless terminal to the target network node such that it may not be decoded by malicious third parties. In this way, it may be possible to release the wireless terminal from the source network node, and resume the wireless terminal in the target network node, such that the target network node is able to identify the identity of the source network node, while still preventing other agents from illegitimately learning the source network node identity.

Some advantages of embodiments herein thereby lies in an increased level of network security against attacks from malicious wireless terminals when resume requests comprise forged resume identifiers, e.g. counterfeit I-RNTIs, as due to the concealed resume identifier as in embodiments herein, may not learn the identity of the source network node or any other information comprised in the concealed resume identifier.

By means of concealing the resume identifier according to embodiments herein, a wireless terminal may safely transmit to the target network a RRC resume request message, e.g. RRC resume request or RRC resume request 1, or any other messages containing a resume identifier, e.g. I-RNTI. In this way, a malicious agent may be able to detect an RRC resume request like message over a radio bearer, e.g. SRB0, but would be unable to identify any identifier relating to a network node identifier or a UE context. Thus, using embodiments herein, it may be possible to attain an additional privacy layer in the wireless communications network keeping the integrity of node and UE context identifiers.

Additionally, thanks to the embodiments herein, malicious agents, e.g. UEs, are prevented to send illegitimate resume requests using intercepted I-RNTI and thus illegitimate requests are avoided causing possible failures to find the pertaining UE Context and thereby unnecessary network signaling is also avoided.

Figure 1:
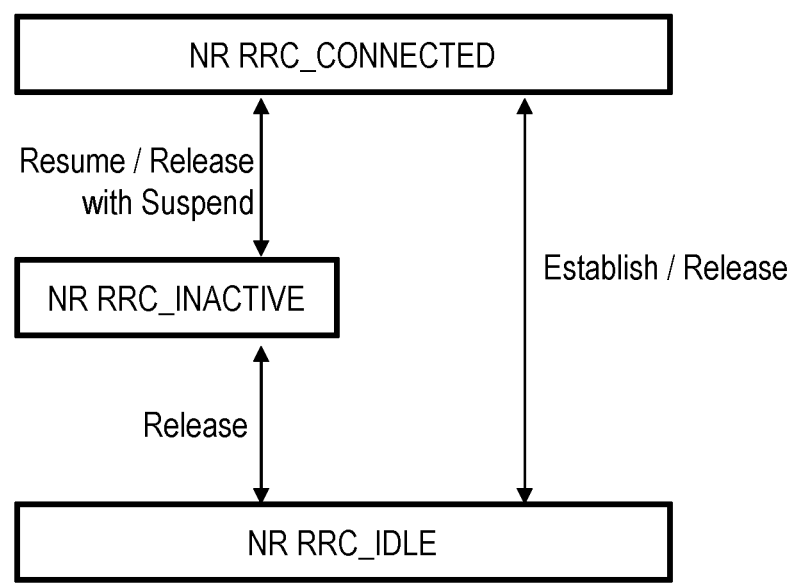
FIG. 1 is a schematic block diagram illustrating prior art.
Figure 2:
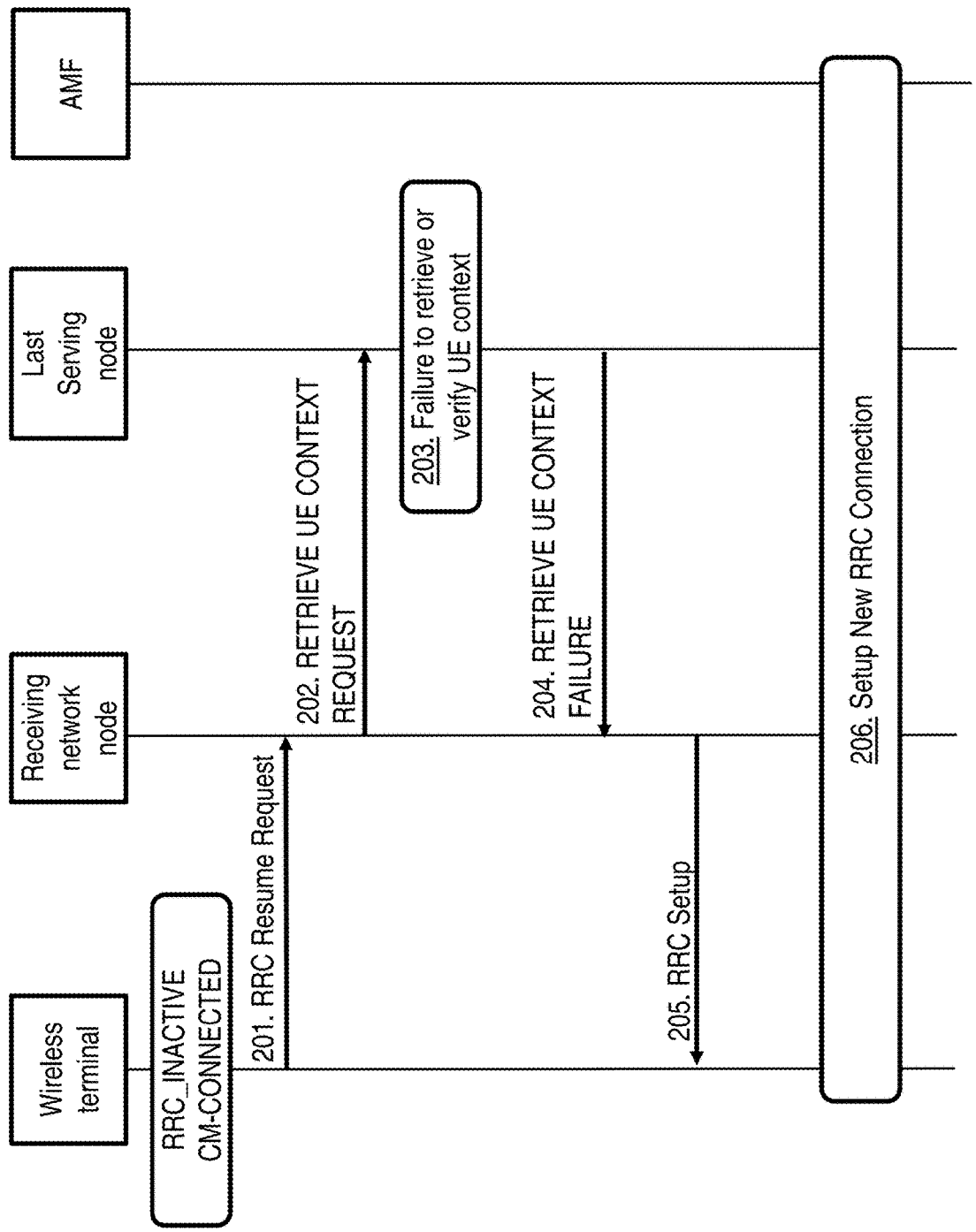
FIG. 2 is a combined flowchart and signaling scheme illustrating prior art.
Figure 3:
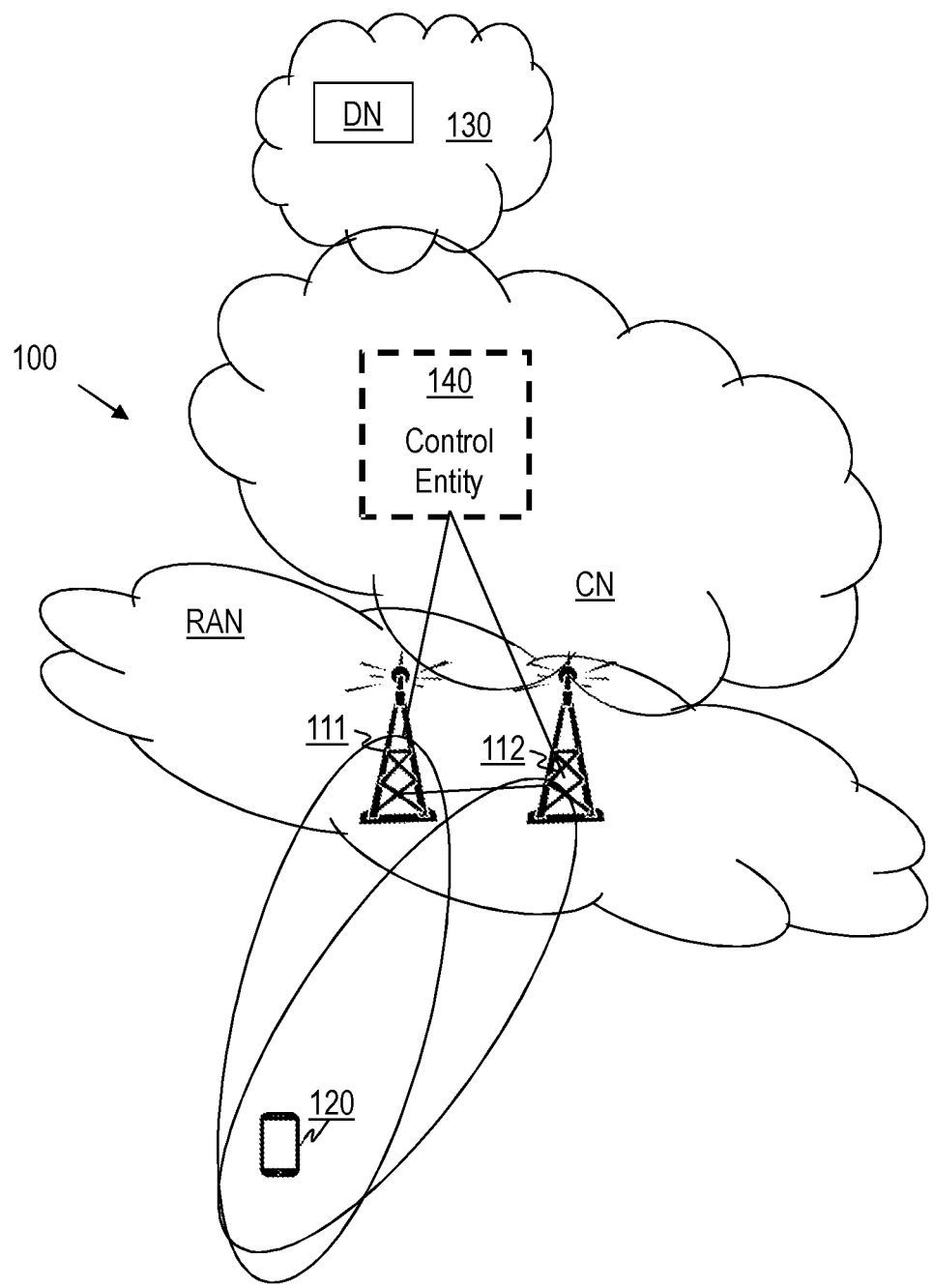
FIG. 3 is a schematic block diagram illustrating embodiments of a wireless communications network.

Embodiments herein relate to wireless communication networks in general. FIG. 3 depicts a schematic overview of a wireless communications network 100 wherein embodiments herein may be implemented. The wireless communications network 100 comprises one or more RANs and one or more CNs. The wireless communications network 100 may use a number of different technologies, such as Wi-Fi, Long Term Evolution, LTE, LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMAX), or Ultra Mobile Broadband (UMB), just to mention a few possible implementations. Embodiments herein relate to recent technology trends that are of particular interest in a context, however, embodiments are also applicable in further development of the existing wireless communication systems such as e.g. WCDMA and LTE.

A number of network nodes operate in the wireless communications network 100 such as e.g. a source network node 111 and a target network node 112. These nodes provide radio coverage in a number of cells which may also be referred to as a beam or a beam group of beams.

The source network node 111 may e.g. be serving a wireless terminal 120 in the wireless communications network 100, according to embodiments herein. In some embodiments, the wireless terminal 120 is released by the source network node 111 and resumed by the target network node 112. Thus, the target network node 112 may additionally be serving the wireless terminal 120.

The source network node 111 and the target network node 112 may each be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B, eNB, eNodeB, a gNB, a base transceiver station, a radio remote unit, an Access Point Base Station, a base station router, a transmission arrangement of a radio base station, a stand-alone access point or any other network unit capable of communicating with a wireless terminal within the service area served by the source network node 111 or target network node 112 depending e.g. on the first radio access technology and terminology used. The source network node 111 the target network node 112 may each be referred to as a serving radio network node and communicates with the wireless terminal 120 with Downlink (DL) transmissions to the wireless terminal 120 and Uplink (UL) transmissions from the wireless terminal 120.

In the wireless communication network 100, one or more wireless terminals operate, such as e.g. the wireless terminal 120. The wireless terminal 120 may also referred to as a device, an IoT device, a mobile station, a non-access point (non-AP) STA, a STA, a UE, and/or a wireless device. The wireless terminal 120 communicate via one or more Access Networks (AN), e.g. RAN, to one or more core networks. It should be understood by the skilled in the art that "wireless terminal" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may be performed by the source network node 111 and the target network node 112. As an alternative, a Distributed Node (DN) and functionality, e.g. comprised in a cloud 130 as shown in FIG. 3, may be used for performing or partly performing the methods herein.

Further, in some embodiments, a network node 140 operates in the wireless communication network 100. The network node 140 may e.g. be a centralized control entity, such as an AMF node, an OAM node or another external function node handling generation and distribution of keys.

A number of embodiments are provided herein, some of which may be seen as alternatives, while some may be used in combination.

Figure 4:
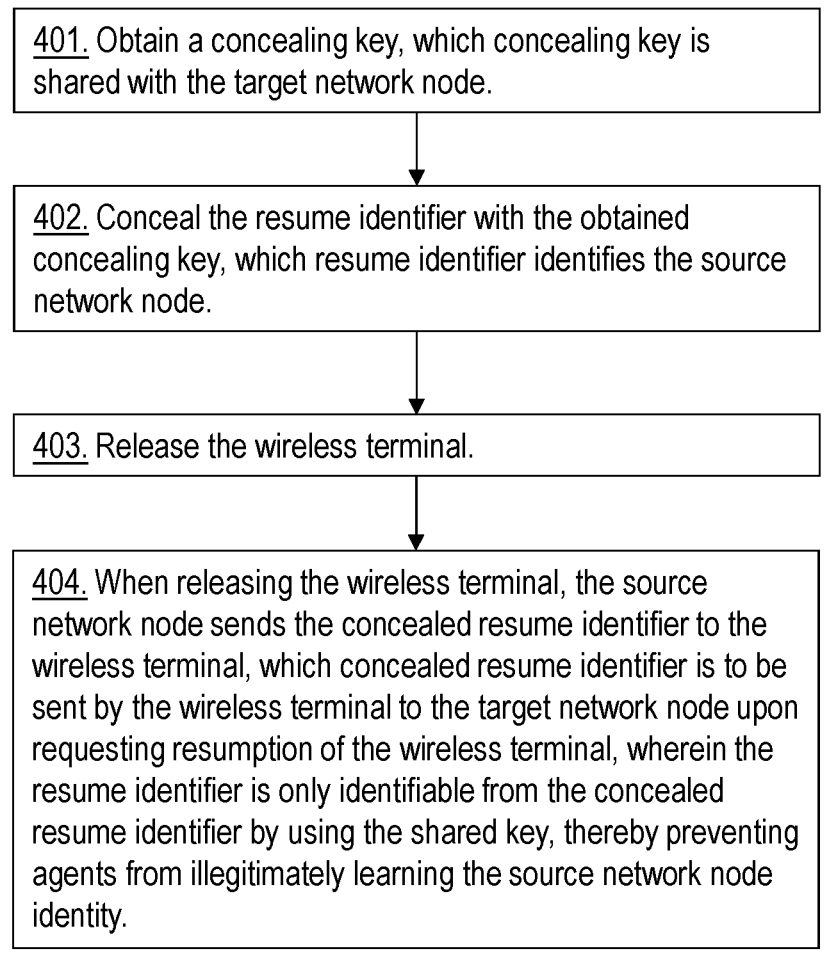
FIG. 4 is a flowchart depicting embodiments of a method in a source network node.

FIG. 4 shows example embodiments of a method performed by the source network node 111, for preventing agents from illegitimately identifying the source network node 111 when resuming the wireless terminal 120 in a target network node 112 in the wireless communications network 100. The method comprises the following actions, which actions may be taken in any suitable order.

Action 401

In order to be able to prevent agents from illegitimately identify the source network node 111, the source network node 111 may need means of concealing its identity when releasing the wireless terminal 120. Thus the source network node 111 obtains a concealing key. The concealing key is shared with the target network node 112.

The concealing key may e.g. be obtained by any one out of:

Generating the concealing key and sending the concealing key to the target network node 112,
receiving the concealing key from a network node,
receiving the concealing key from a network node AMF,
receiving the concealing key from an Operations, Administration and Maintenance (OAM) node, or receiving the concealing key from the target network node 112. In this way, in some embodiments it may possible for the source network node 111 to obtain the shared concealing key from a centralized unit which may be a centralized network node, e.g. an OAM or an AMF. In some other embodiments the shared concealing key may be obtained from a distributed unit which may be a distributed network node, e.g. the target network node 112. In some embodiments, alternatively, the shared concealing key is generated by the source network node 111 and sent to the target network node 112.

Action 402

When releasing the wireless terminal 120, the source network node 111 may need to send a resume identifier to the wireless terminal 120 which may be used to identify the source network node 111 in order for the wireless terminal 120 to be able to resume a connection. To prevent agents from illegitimately learning the source network node 111 identity, the source network node 111 thus conceals the resume identifier with the obtained concealing key. The resume identifier identifies the source network node 111. In this way, a concealed resume identifier may later on be communicated such that the resume identifier, and thus also the source network node 111 identity, may only be identified by a node using the shared concealing key.

In some embodiments the concealing key is represented by an encryption key. This means that in these embodiments, the concealing key is an encryption key. In these embodiments, the concealing of the resume identifier with the obtained concealing key is performed by encrypting the resume identifier with the obtained encryption key.

In some embodiments the concealing key is represented by a vector. This means that in these embodiments, the concealing key is a vector. In these embodiments, the concealing of the resume identifier with the obtained concealing key is performed by scrambling the resume identifier with the obtained vector.

In some embodiments the concealing key is represented by an encryption key and a vector. This means that in these embodiments, the concealing key comprises both a vector and an encryption key. In these embodiments, the concealing of the resume identifier with the obtained concealing key is performed by encrypting and scrambling the resume identifier with the obtained encryption key and vector.

Hence, in some embodiments, it may be possible to conceal the resume identifier by means of encryption, scrambling, or both scrambling and encryption.

The resume identifier may comprise a source node identifier. The source node identifier identifies the source network node 111. In this alternative, the concealing of the resume identifier comprises concealing the source node identifier with the obtained concealing key.

The resume identifier may be represented by an Inactive-Radio Network Temporary Identifier (I-RNTI). This means that the resume identifier may be an I-RNTI.

Action 403

The resume identifier will be communicated to the target network node 112 via the wireless terminal 120, when the wireless terminal 120 after being released, resumes the connection, e.g. RRC connection to the target network node 112. Hence, the source network node 111 releases the wireless terminal 120. In this way, the wireless terminal 120 e.g. is transitioned to an inactive state, e.g. RRC_INACTIVE.

Action 404

When releasing the wireless terminal 120, the source network node 111 sends the concealed resume identifier to the wireless terminal 120. The concealed resume identifier is to be sent by the wireless terminal 120 to the target network node 112 upon requesting resumption of the wireless terminal 120. The resume identifier is only identifiable from the concealed resume identifier by using the shared concealing key, thereby preventing agents from illegitimately learning the source network node 111 identity. The wireless terminal 120 may thus receive the concealed resume identifier, which may be sent with a resume request upon resuming the connection such as an RRC connection with e.g. the target network node 112. Since the resume identifier is concealed, the wireless terminal 120 may not be able to decode the concealed resume identifier. Similarly, in some embodiments, any other agent intercepting the concealed resume identifier may not be able to decode the concealed resume identifier to learn the contents within, e.g. the source network node 111 identity. Only a node that has and/or uses the shared concealing key can identify the resume identifier from the concealed resume identifier.

In some embodiments the source network node 111 possesses, e.g. hosts, a UE context of the wireless terminal 120. In these embodiments, the concealed resume identifier sent to the wireless terminal 120, further prevents agents from illegitimately retrieving the possessed UE context.

In some embodiments the concealed resume identifier to be sent by the wireless terminal 120 to the target network node 112 upon requesting resumption of the wireless terminal 120, enables the target network node 112 to decode the concealed resume identifier with the shared concealing key to identify the source network node 111. The source network node 111 identity is to be used when resuming the wireless terminal 120 in the target network node 112. The target network node 112 shares the concealing key and may therefore decode the concealed resume identifier, and identify the source network node 111 identity. When identified, the target network node 112 may contact the source network node 111 to e.g. request the UE context when possessed by the source network node 111 to be used when resuming the connection of the wireless terminal 120.

Thus in some embodiments, the source network node 111 identity is to be used by the target network node 112 to address a request for retrieving the UE context of the wireless terminal 120 to be used when resuming the wireless terminal 120 in the target network node 112.

In some embodiments the RAT used in the method above is 5G NR, of 3GPP.

Figure 5:
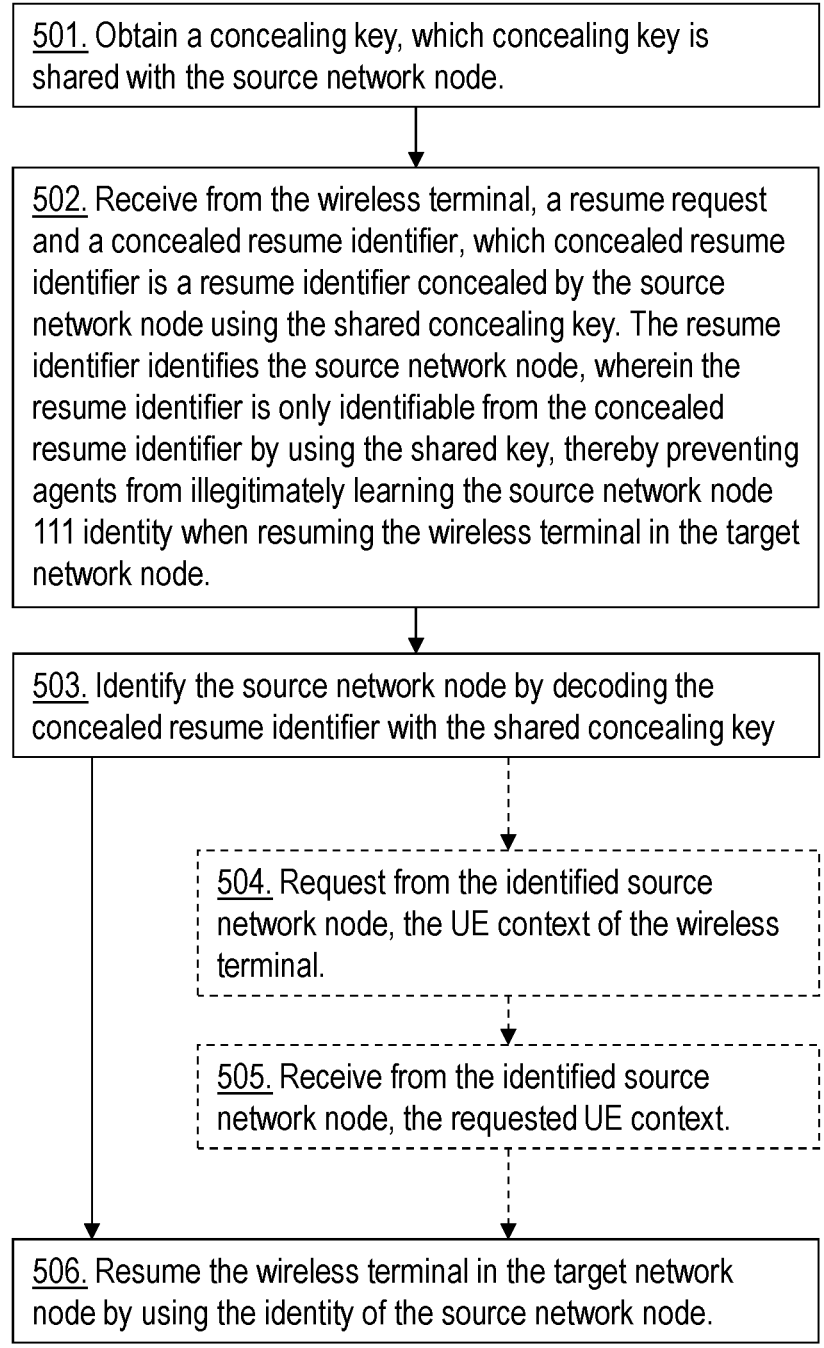
FIG. 5 is a flowchart depicting embodiments of a method in a target network node.

FIG. 5 shows example embodiments of a method performed by the target network node 112, for preventing agents from illegitimately identifying the source network node 111 when resuming the wireless terminal 120 in the target network node 112 in the wireless communications network 100. The method comprises the following actions, which actions may be taken in any suitable order.

Action 501

In order to be able to prevent agents from illegitimately identify the source network node 111 identity, the target network node 112 needs a shared concealing key. Hence, the target network node 112 obtains a concealing key. The concealing key is shared with the source network node 111.

The obtaining of the concealing key, may e.g. be performed by any one out of:

Generating the concealing key and sending the concealing key to the source network node 111,
receiving the concealing key from a network node,
receiving the concealing key from an AMF network node,
receiving the concealing key from an OAM network node, or
receiving the concealing key from the source network node 111.

As seen from above, it may in some embodiments be possible for the target network node 112 to obtain the shared concealing key from a centralized unit which may be a centralized network node, e.g. an OAM or an AMF. In some other embodiments the shared concealing key may be obtained from a distributed unit which may be a distributed network node, e.g. the source network node 111 when being a distributed unit. In some embodiments, alternatively, the shared concealing key is generated by the target network node 112 and sent to the source network node 111.

Action 502

The target network node 112 receives a resume request and a concealed resume identifier from the wireless terminal 120. The concealed resume identifier is a resume identifier concealed by the source network node 111 using the shared concealing key. The resume identifier identifies the source network node 111. The resume identifier is only identifiable from the concealed resume identifier by using the shared concealing key, and is thereby preventing agents from illegitimately learning the source network node 111 identity when resuming the wireless terminal 120 in the target network node 112. E.g., by identifying the resume identifier, the target network node 112 is enabled to initiate a procedure to resume the wireless terminal 120 in the target network node wherein the wireless terminal 120 may be inactive and may have been previously released by the source network node 111.

In some embodiments the concealing key is represented by an encryption key, and wherein the concealed resume identifier is the resume identifier encrypted by the source network node 111, encrypted with the encryption key.

In some embodiments the concealing key is represented by a vector, and wherein the concealed resume identifier is the resume identifier scrambled by the source network node 111, scrambled with the vector.

In some embodiments the concealing key is represented by an encryption key and a vector, and wherein the concealed resume identifier is the resume identifier encrypted and scrambled by the source network node 111, encrypted and scrambled with the encryption key and vector.

Hence, the concealed resume identifier may e.g. be concealed using encryption, scrambling, or both scrambling and encryption.

In some embodiments the resume identifier comprises a source node identifier, which source node identifier identifies the source network node 111. In these embodiments the concealed resume identifier may comprise the concealed source node identifier concealed by the source network node 111, and concealed with the concealing key. In this way, e.g. the source network node 111 identity may not be illegitimately learned as the identifier of the source network node 111 is concealed.

The resume identifier may be represented by an I-RNTI.

The UE context may be needed to resume the connection of the wireless terminal 120 in the target network node 112. The source network node 111 may possess, e.g. host, a UE context of the wireless terminal 120. In this alternative, the concealed resume identifier received from the wireless terminal 120, may further prevent agents from illegitimately retrieving the possessed UE context.

Action 503

The target network node 112 identifies the source network node 111 by decoding the concealed resume identifier with the shared concealing key. The resume identifier identifies the source network node 111, and enables network node 112 to resume a connection with the wireless terminal 120 using the source network node 111 identity.

Action 504

In some embodiments, the target network node 112 requests the UE context of the wireless terminal 120 from the identified source network node 111.

Action 505

The target network node 112 may then receive the requested UE context from the identified source network node 111. In this way, it may be possible to retrieve the UE context of the wireless terminal 120, while still preventing agents to illegitimately identify the source network node or to illegitimately request or retrieve the possessed UE context.

Action 506

The target network node 112 may then resume the wireless terminal 120 in the target network node 112 by using the identity of the source network node 111, and e.g. based on the received UE context. In this way, the wireless terminal 120 may be able to switch to an active state, e.g. RRC_CONNECTED.

The RAT, used in the method above may be 5G NR of 3GPP.

The above embodiments will now be further explained and exemplified below. The embodiments and examples mentioned below may be combined with any suitable embodiments described above.

Embodiments herein may comprise methods for securing the transmission and reception of a resume identifier such as an I-RNTI, e.g. a I-RNTI-Value or a ShortI-RNTI-Value as defined in 3GPP TS 38.331 clause 6.3.2, e.g. when resuming the wireless terminal 120. The methods may, as mentioned above, be performed in order to prevent agents from illegitimately identifying the source network node 111 when resuming a wireless terminal 120 in the target network node 112. In some embodiments this may be achieved by concealing the resume identifier, which may be performed with the use of a concealing key which may be represented by an encryption key, a scrambling vector, or both. In some embodiments the concealing key may be obtained by various methods performed by the source network node 111 or the target network node 112, which will be further exemplified below.

In some embodiments and in the following examples, the target network node 112 may be the same or different from the source network node 111.

Centralized Key Management

In some embodiments herein, a centralized control entity, such as AMF, OAM, or another external function handles generation and distribution of keys. The control entity, e.g. the network node 140, may first generate one or more concealing keys and distribute the one or more concealing keys to suitable network nodes, e.g. the target network node 112 and the source network node 111. In some embodiments the control entity sends the concealing key to all network nodes under its control, e.g. the source network node 111 and the target network node 112.

In some embodiments the concealing key may be generated by the control entity and shared with all network nodes pertaining to a tracking area list.

Distributed Key Management

The concealing key may be generated by a distributed network node, e.g. the source network node 111 or the target network node 112, which shares the concealing key among other network nodes.

In some embodiments the key generation may be distributed and performed in e.g. each network node. Each network node, e.g. the target network node 112 and source network node 111, may first generate one or more respective concealing keys and distribute the one or more respective concealing keys to other network nodes, e.g. the target network node 112 and source network node 111.

In some embodiments each network node e.g. the target network node 112 and source network node 111 sends its respective one or more generated concealing keys to its neighbour nodes, e.g. the network nodes within the same RNA.

The neighbour nodes may be determined by a signalling connection available between the nodes, e.g. via XnAP, NGAP, X2AP, S1AP.

Control Entity Generating Shared Concealing Keys for Encryption

Figure 6:
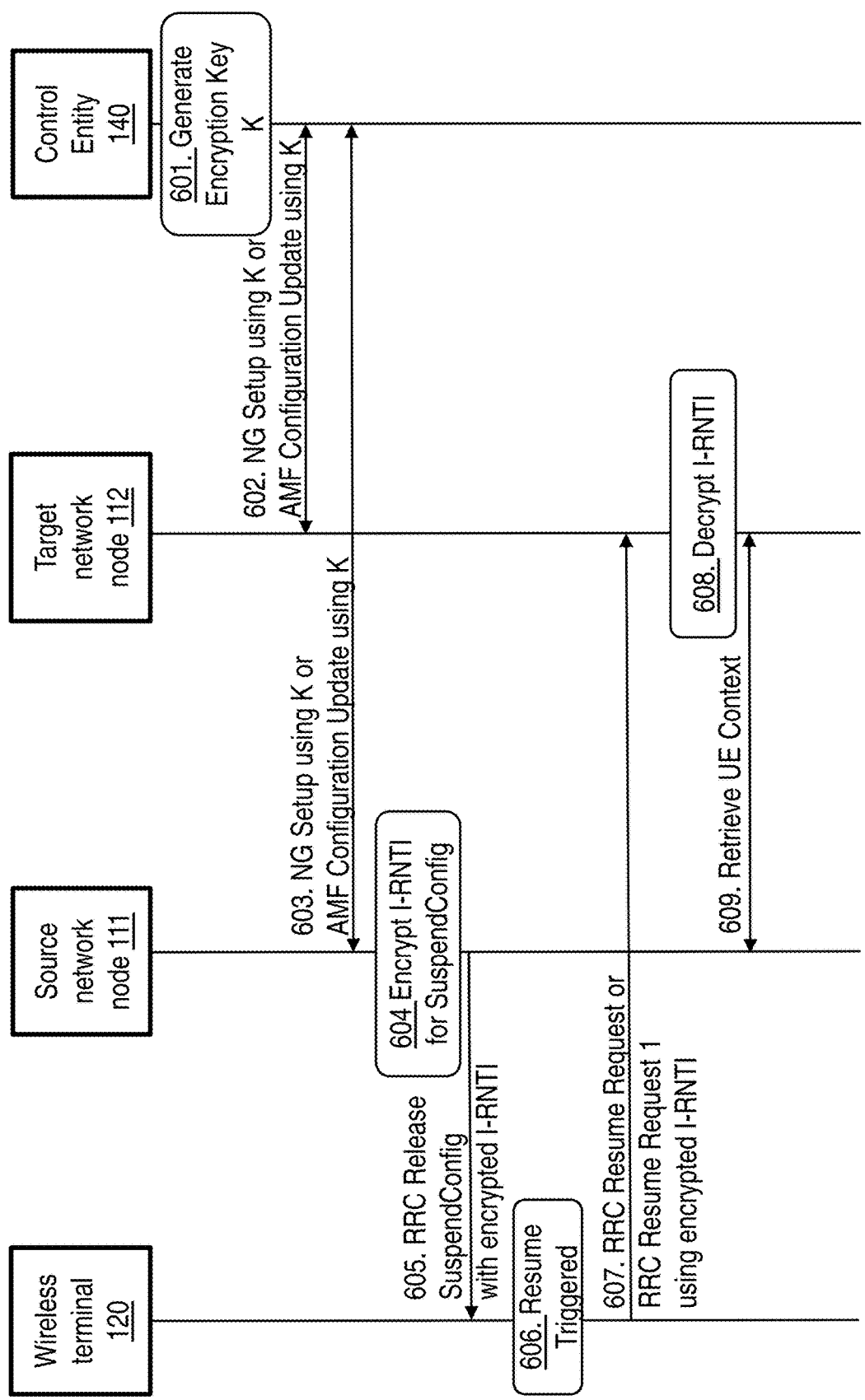
FIG. 6 is a combined flowchart and signaling scheme depicting embodiments herein.

The following section exemplifies embodiments comprising the control entity, e.g. the network node 140, generating the shared concealing key represented by an encryption key and is illustrated in FIG. 6. In some embodiments, the control entity may operate as a CN node such as AMF, or as OAM, or another external function.

The control entity may generate 601 one or more encryption keys K to be used for protection of the resume identifier and for preventing agents to illegitimately learn the source network node 111 identity. The generated one or more encryption keys may be referred to as I-RNTIenc.

The control entity may then distribute the latest generated I-RNTIenc to all network nodes under its control e.g. the source network node 111 and the target network node 112. As an example, in the case of a control entity operating as an AMF or an AMF pool, the control entity may distribute the same I-RNTIenc to all the network nodes pertaining to the same Tracking Area List, e.g. at NG Setup 602, 603 using K or an AMF Configuration Update using K.

The source network node 111 node may receive and use the I-RNTIenc to encrypt 604 the complete or partial resume identifier, e.g. I-RNTI for suspend config. The source network node 111 may then release 605 the wireless terminal 120 to RRC_INACTIVE using a suspend configuration comprising the encrypted or partially encrypted resume identifier, e.g. an RRC Release SuspendConfig comprising the encrypted I-RNTI. The wireless terminal 120 may then trigger 606 a resume procedure. The target network node 112 may later receive 607 a resume request from the wireless terminal 120 in RRC_INACTIVE state, e.g. a RRC Resume Request or RRC Resume Request 1 comprising the encrypted I-RNTI.

The target network node 112 may use the latest received I-RNTIenc to decrypt 608 the received encrypted or partially encrypted resume identifier, e.g. I-RNTI, comprised in the resume request. In some embodiments the target network node 112 may further also use one or more of previously received I-RNTIenc to decrypt the received encrypted or partially encrypted resume identifier, e.g. I-RNTI.

In some example scenarios, the decryption process is successful. In these embodiments the target network node 112 may consider the resume attempt as valid and the request may be further processed. The target network node 112, may then transition the wireless terminal 120 from RRC_INACTIVE to RRC_CONNECTED. In doing so, the target network node 112 may assume the role of the source network node 111, e.g. target network node 112 may retrieve 609 and possess, e.g. host, the UE context of the wireless terminal 120.

In some example scenarios, the decryption process is not successful. In these embodiments the target network node 112 may consider the resume attempt as invalid and the target network node 112 may decide to not continue processing the resume request.

Distributed Generation of Shared Vectors for Scrambling

Figure 7:
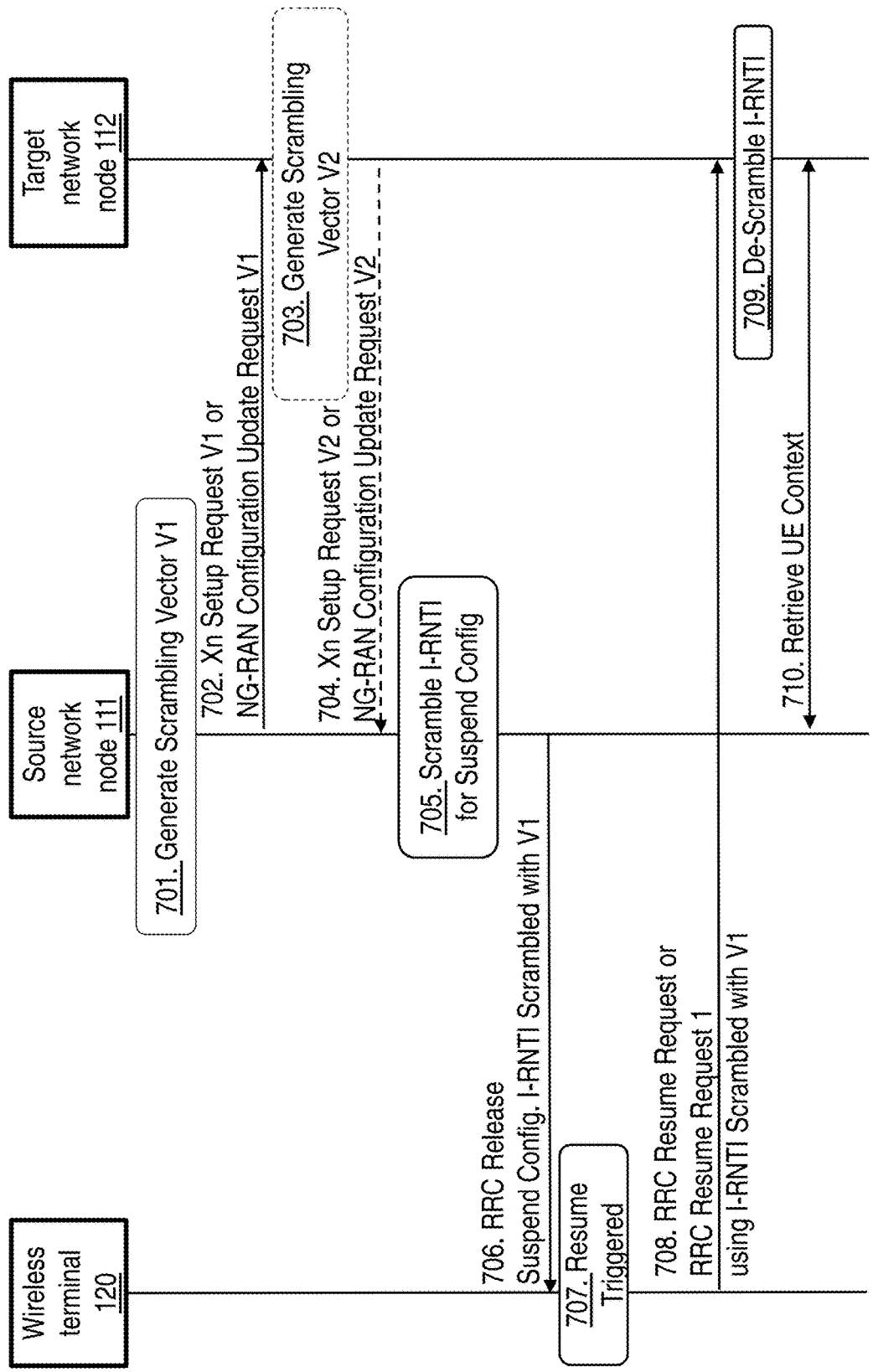
FIG. 7 is a combined flowchart and signaling scheme depicting embodiments herein.

The following section exemplifies embodiments wherein the source network node 111 generates and shares the concealing key when represented by a scrambling vector as illustrated in FIG. 7.

The source network node 111 may generate 701 one or more scrambling vectors V1 to be used for protection of the resume identifier and for preventing agents to illegitimately learn the source network node 111 identity. Said one or more scrambling vectors may be referred to as I-RNTIscr.

In some embodiments, the source network node 111 generating the one or more scrambling vectors, shares the one or more scrambling vectors with its neighbors, e.g. to the target network node 112 at Xn setup request, Xn Setup Response, NG-RAN Configuration Update Request, or NG-RAN Configuration Update Acknowledge 702 using V1.

Each network node may generate its own respective one or more scrambling vectors, e.g. the target network node 112 may generate 703 one or more scrambling vectors V2. The one or more scrambling vectors of each network node may differ in size and number from any other node's respective generated one or more scrambling vectors. In this way, each network node may share its generated respective one or more scrambling vectors with its neighbors, e.g. during Xn setup request, Xn Setup Response, NG-RAN Configuration Update Request, or NG-RAN Configuration Update Acknowledge 704 using V2. The source network node 111 node may then first receive and use the I-RNTIscr to scramble 705 the complete or partial resume identifier, e.g. I-RNTI for use in suspend config. The source network node 111 may then release the wireless terminal to RRC_INACTIVE using a suspend configuration comprising the scrambled or partially scrambled resume identifier e.g. by sending 706 a RRC Release Suspend ConFIG. I-RNTI Scrambled with V1. The wireless terminal 120 may then trigger 707 a resume procedure. The target network node 112 may later receive 708 a resume request from the wireless terminal 120 in RRC_INACTIVE state, e.g. RRC resume request or RRC resume request 1 using I-RNTI scrambled with V1. The target network node 112 may use the latest received I-RNTIscr to descramble 709 the received scrambled or partially scrambled resume identifier, e.g. I-RNTI, comprised in the resume request.

The target network node 112 may further also use one or more of previously received I-RNTIscr to descramble the received scrambled or partially scrambled resume identifier, e.g. I-RNTI.

In some example scenarios, the descrambling process is successful. In these embodiments the target network node 112 may consider the resume attempt as valid and the request may be further processed. The target network node 112 may then transition the wireless terminal 120 from RRC_INACTIVE to RRC_CONNECTED. In doing so, the target network node 112 may assume the role of the source network node 111, e.g. target network node 112 may retrieve 710 and possess, e.g. host, the UE context of the wireless terminal 120.

In some other example scenarios, the descrambling process is not successful. In these embodiments the target network node 112 may consider the resume attempt as invalid and the target network node 112 may decide to not continue processing the resume request.

Control Entity Generating Shared Vectors for Scrambling

The following section exemplifies embodiments comprising the control entity, e.g. the network node 140, generating the shared concealing key represented by a scrambling vector.

In some embodiments, the control entity generates one or more scrambling vectors similar to generating the encryption keys. This may be performed using any of the suitable embodiments as for generating the one or more encryption keys above.

In some embodiments the control entity generates one or more scrambling vectors which are then distributed to the nodes under its control, e.g. the source network node 111 and the target network node 112.

In some embodiments the source network node 111 releases the wireless terminal 120 to RRC_INACTIVE. The source network node 111 may scramble the complete or partial resume identifier e.g. I-RNTI using the received one or more scrambling vectors and sends the scrambled resume identifier to the wireless terminal 120. The wireless terminal 120 may initiate a resume procedure with the target network node 112 and may send the scrambled resume identifier to the target network node 112. The target network node 112 may then receive the scrambled resume identifier from the wireless terminal 120 and may further resume the connection with the wireless terminal 120 and descramble the received scrambled resume identifier before e.g. proceeding with the UE context retrieval.

Distributed Generation Shared Concealing Keys for Encryption

The following section exemplifies embodiments comprising a generating network node, e.g. the source network node 111 or the target network node 112, generating and sending the shared concealing key represented by an encryption key to the target network node 112 and the source network node 111.

In some embodiments, the generating network node generates one or more encryption keys similar to the source network node 111 generating the scrambling vectors as illustrated in FIG. 7. This may be performed using any of the suitable embodiments as for generating the one or more scrambling vectors above.

In some embodiments, one or more network nodes, e.g. the target network node 112, source network node 111, or both, generates one or more respective encryption keys and shares the one or more encryption keys with its respective neighbors e.g. the source network node 111 or the target network node 112.

The source network node 111 may release the wireless terminal 120 to RRC_INACTIVE. The source network node 111 may encrypt the complete or partial resume identifier e.g. I-RNTI using the received one or more encryption keys and send the encrypted resume identifier to the wireless terminal 120. The wireless terminal 120 may initiate a resume procedure with the target network node 112 and send the encrypted resume identifier to the target network node 112. The target network node 112 may then receive the encrypted resume identifier from the wireless terminal 120 and may further resume the connection with the wireless terminal 120 and decrypt the received encrypted resume identifier before e.g. proceeding with the UE context retrieval.

Scrambling Vector

The concealing key may be represented by a scrambling vector. In these embodiments, the generation of scrambling vectors may be performed using a number of bits that may be determined based on any one or more out of:

Same as a smaller number of bits of an I-RNTI that the source network node 111 uses to encode the UE Context identifier,
  a fixed or flexible number of bits of an I-RNTI that the source network node 111 uses to encode the source network node 111 identifier, or
  a fixed or a flexible number of bits of an I-RNTI that the source network node 111 uses to encode the UE Context ID.

Encryption

To secure the delivery of the resume identifier, e.g. I-RNTI, the concealing of the resume identifier may be concealed by using encryption e.g. using an encryption key. The encryption may be using any suitable encryption mechanism such as asymmetric or symmetric encryption. In some embodiments, the encryption uses public key cryptography for encrypting the resume identifier e.g. wherein each network node has a private key and shares its public key.

Determining Source Node Identity from the Resume Identifier

The target network node 112 may use a resume identifier to retrieve information of the connection of wireless terminal 120 by e.g. based on a predetermined number of bits in the resume identifier.

In some embodiments, a first set of bits in the resume identifier, e.g. I-RNTI, may encode a location identifier, e.g. a source network node 111 identity, indicating the location of where the UE context of the wireless terminal 120 is stored. In this way, the target network node 112, may legitimately learn the source network node 111 identity by identifying the identity from the predetermined number of bits.

A second set of bits in the resume identifier may encode a wireless terminal identity, e.g. the identity of the wireless terminal 120, indicating for which wireless terminal 120 a given UE context relates.

Concealing a Resume Identifier

The concealing key used in embodiments herein, may be generated based on multiple criteria, e.g. a fixed or configurable time interval, geographical area, usage of certain services, service level agreements, network performance.

As mentioned above, a complete or partial resume identifier, e.g. I-RNTI, may be concealed.

In some embodiments where the full resume identifier is concealed, all bits in the resume identifier may be given as an input to a concealing mechanism, e.g. encryption or scrambling function, which provides another set of the same number of bits as an output, e.g. a concealed I-RNTI.

In some other embodiments, where the resume identifier is only partially concealed, the resume identifier may be provided to the concealing mechanism, e.g. encryption or scrambling function, which provides another set a partially concealed version of the part of the resume identifier provided. In this way, only a partial bit string of the resume identifier may be changed to an encrypted or scrambled partial bit string comprising the same number of bits.

In an example scenario the source network node 111 may partially conceal a resume identifier by concealing only the bits corresponding to the wireless terminal 120 identity or only the bits corresponding to the source network node 111 identity.

Transmitting Resume Identifier

To enable the wireless terminal 120 to securely resume connection, e.g. at the target network node 112, an encrypted resume identifier is transmitted to the wireless terminal 120, e.g. a concealed I-RNTI.

The resume identifier may be an I-RNTI represented as a short I-RNTI or full I-RNTI.

The concealed resume identifier, e.g. concealed I-RNTI may be included in an RRC release message comprising a suspendConfig information which may be sent to the wireless terminal 120.

The RRC release message may contain an indication that indicates whether or not the message comprises a concealed resume identifier. The indication may further indicate to the wireless terminal 120 which actions to take during a resume procedure, e.g. the indication may further indicate the use of a logical channel to be used when transmitting an RRC resume request.

Receiving a Resume Request

The target network node 112 may receive a RRC resume request from the wireless terminal 120 comprising the resume identifier, e.g. an RRC resume request or an RRC resume request 1 comprising an I-RNTI.

The target network node 112 may in some embodiments first determine that the resume identifier is concealed, e.g. encrypted, scrambled or both. This may be determined by the RRC resume request comprising an indication that the resume identifier is concealed. The indication may be comprised in a bit or a field of the RRC resume request. In some embodiments, the use of logical channel for transmitting the message comprising the RRC resume request may indicate whether or not the resume identifier is concealed. The target network node 112 may then continue with a procedure related to the RRC resume request, e.g. retrieving the UE context of the wireless terminal 120.

Wireless Terminal 120 Communication

In an example scenario, the wireless terminal 120 may receive a message from the source network node 111 which may comprise the concealed resume identifier. The concealed resume identifier may e.g. be received when being released by the source network node 111 e.g. part an RRC release message.

When in inactive state, the wireless terminal 120 may perform a two-step resume procedure, e.g. by first sending an RRC resume request to the target network node 112 wherein the target network node 112 may further trigger the source network node 111 to send to the target network node 112 the UE context of the wireless terminal 120 and continue the RRC resume procedure.

In some embodiments, the wireless terminal 120 further stores an indication of whether or not the resume identifier is concealed. In this way a resume request may be based on the indication of whether or not the resume identifier is concealed.

An indication of the concealed resume identifier may be achieved by defining a new field in e.g. RRC release or resume, wherein the field may indicate whether or not the I-RNTI is concealed. In some embodiments the field further contains information of which concealing type is used, e.g. encryption, scrambling, or both.

The wireless terminal 120 may also receive a concealed resume identifier in a contention resolution message.

Hybrid Key Management

In some embodiments, the concealing key is represented by two parts, an encryption key and a scrambling vector. In these embodiments, a first part of the concealing key may be generated by the control entity and a second part may be generated by a network node, e.g. a scrambling vector may be generated by a control entity and an encryption key may be generated by a network node, e.g. the target network node 112 and source network node 111.

concealing key wherein only the pointer to the external copy of the concealing key may be maintained locally at the network node, e.g. the source network node 111 and/or the target network node 112.

Example of Implementation in NGAP and XnAP Interfaces

The following sections provide possible implementations of embodiments herein in the NGAP and XnAP interfaces.

Example of NGAP Implementation

In some embodiments, the following procedures and messages may be impacted:
NG setup procedure
    message: NG SETUP RESPONSE
AMF configuration update procedure
    message: AMF CONFIGURATION UPDATE In some embodiments, a new IE, referred to herein as an inactive security key, and may be added to the impacted messages.

In some embodiments, an NG SETUP RESPONSE message may be sent by the AMF to transfer application layer information for a Next Generation Control Plane (NG-C) interface instance. The message may be sent by an AMF to a network node, e.g. the source network node 111 or target network node 112, and is exemplified below.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF Name | M | | 9.3.3.21 | | YES | reject |
| Served GUAMI List | | 1 | | | YES | reject |
| > Served GUAMI Item | | 1..<maxnoofServedGUAMIs> | | | — | |
| >>GUAMI | M | | 9.3.3.3 | | — | |
| >>Backup AME Name | O | | AMF Name 9.3.3.21 | | — | |
| >>GUAMI Type | O | | ENUMERATED (native, mapped, ...) | | YES | ignore |
| Relative AMF Capacity | M | | 9.3.1.32 | | YES | ignore |
| PLMN Support List | | 1 | | | YES | reject |
| >PLMN Support Item | | 1..< maxnoofPLMNs> | | | — | |
| >>PLMN Identity | M | | 9.3.3.5 | | — | |
| >>Slice Support List | M | | 9.3.1.17 | Supported S-NSSAIs per PLMN | — | |
| >>NPN Support | O | | 9.3.3.44 | If NID IE is included, it identifies a SNPN together with the PLMN Identity IE. | YES | reject |
| >>Extended Slice Support List | M | | 9.3.1.191 | Additional Supported S-NSSAIs per PLMN | YES | reject |
| Criticality Diagnostics | O | | 9.3.13 | | YES | ignore |
| UE Retention Information | O | | 9.3.1.117 | | YES | ignore |
| IAB Supported | O | | ENUMERATED (true, ...) | Indication of support for IAB. | YES | ignore |
| Inactive Security Key | O | | 9.3.1.xxx | | YES | ignore |

Maintaining the Concealing Key

A network node, e.g. the source network node 111 or the target network node 112, may obtain a concealing key and may further maintain a local copy of the concealing key within the network node. In some embodiments, obtaining a concealing key may comprise receiving a pointer to the AMF Configuration Update In some embodiments, an AMF CONFIGURATION UPDATE message may be sent by the AMF to transfer updated information for an NG-C interface instance.

The message may be sent from an AMF to a network node, e.g. the source network node 111 or target network node 112, and is exemplified below.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| AMF Name | O | | 9.3.3.21 | | YES | reject |
| Served GUAMI List | | 0..1 | | | YES | reject |
| >Served GUAMI Item | | 1..<maxnoofServedGUAMIs> | | | — | |
| >>GUAMI | M | | 9.3.3.3 | | — | |
| >>Backup AMF Name | O | | AMF Name 9.3.3.21 | | — | |
| >>GUAMI Type | O | | ENUMERATED (native, mapped, ...) | | YES | ignore |
| Relative AMF Capacity | O | | 9.3.1.32 | | YES | ignore |
| PLMN Support List | | 0..1 | | | YES | reject |
| >PLMN Support Item | | 1..< maxnoofPLMNS> | | | — | |
| >>PLMN Identity | M | | 9.3.3.5 | | — | |
| >>Slice Support List | M | | 9.3.1.17 | Supported S-NSSAIs per PLMN or per SNPN. | — | |
| >>NPN Support | O | | 9.3.3.44 | If the NID IE is included, it identifies a SNPN together with the PLMN Identity IE. | YES | reject |
| >>Extended Slice Support List | O | | 9.3.1.191 | Additional Supported S-NSSAIs per PLMN | YES | reject |
| AMF TNL Association to Add List | | 0..1 | | | YES | ignore |
| >AMF TNL Association to Add Item | | 1..< maxnoofTNLAssociations> | | | — | |
| >>AMF TNL Association Address | M | | CP Transport Layer Information 9.3.2.6 | AMF Transport Layer information used to set up the new TNL association. | — | |
| >>TNL Association Usage | O | | 9.3.2.9 | | — | |
| >> TNL Address Weight Factor | M | | 9.3.2.10 | | — | |
| AMF TNL Association to Remove List | | 0..1 | | | YES | ignore |
| >AMF TNL Association to Remove Item | | 1..< maxnoofTNLAssociations> | | | — | |
| >>AMF TNL Association Address | M | | CP Transport Layer Information 9.3.2.6 | Transport Layer Address of the AMF. | — | |
| >>TNL Association Transport Layer Address NG-RAN | O | | CP Transport Layer Address 9.3.2.6 | Transport Layer Address of the NG-RAN node. | YES | reject |
| AMF TNL Association to Update List | | 0..1 | | | YES | ignore |
| >AMF TNL Association to Update Item | | 1..<maxnoofTNLAssociations> | | | — | |
| >>AMF TML Association Address | M | | CP Transport Layer Information 9.3.2.6 | AMF Transport Layer information used to identify the TNL association to be updated. | — | |
| >TNL Association Usage | O | | 9.3.2.9 | | — | |
| >>TNL Address Weight Factor | O | | 9.3.2.10 | | — | |
| Inactive Security Key | O | | 9.3.1.xxx | | YES | ignore |

| Range bound | Explanation |
|---|---|
| maxnoofServedGUAMIs | Maximum no. of GUAMIs served by an AMF. Value is 250. |
| maxnoofPLMNs | Maximum no. of PLMNs per message. Value is 12. |
| maxnoofTNLAssociations | Maximum no. of TNL Associations between the NG-RAN node and the AMF. Value is 32. |

Inactive Security Key

In some embodiments, the inactive security key IE may be used to apply security for wireless terminals, e.g. the wireless terminal 120, in RRC_INACTIVE state in the NG-RAN. The scenarios may further be defined in TS 33.501. The inactive security key IE is exemplified below.

| IE/Group Name | Presence | Range | IE type and reference | Semantics description |
|---|---|---|---|---|
| Inactive Security Key | M | | BIT STRING (SIZE(256)) | Key material for NG-RAN node as defined in TS 33.501 [13] |

Example of XnAP Implementation

In the below XnAP examples, the first network node may refer to the source network node 111 and the second network node may refer to the target network node 112.

In some embodiments, the following messages may be impacted for XnAP implementation:
  XN SETUP REQUEST
  XN SETUP RESPONSE
  NG-RAN NODE CONFIGURATION UPDATE
  NG-RAN NODE CONFIGURATION UPDATE ACKNOWLEDGE In some embodiments, a new IE, referred to herein as an inactive security key, and may be added to the impacted messages.

Xn Setup Request

In some embodiments, the XN SETUP REQUEST message is exemplified below and may be sent by a first network node to a neighboring second network node to transfer application data for an Xn-C interface instance.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.2.3 | | YES | reject |
| TAI Support List | M | | 9.2.3.20 | List of supported TAs and associated characteristics. | YES | reject |
| AMF Region Information | | | 9.2.3.83 | Contains a list of all the AMF Regions to which the NG-RAN node belongs. | YES | reject |
| List of Served Cells NR | | 0 .. <maxnoofCellsinNG-RAN node> | | Contains a list of cells served by the gNE. If a partial list of cells is signalled, it contains at least one cell per carrier configured at the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| List of Served Cells E-UTRA | | 0 .. <maxnoofCellsinNG-RAN node> | | Contains a list of cells served by the ng-eNB. If a partial list of calls is signalled, it contains at least one cell per carrier configured at the ng-eNB. | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| Interface Instance Indication | O | | 9.2.2.39 | | YES | reject |
| TNL Configuration Info | O | | 9.2.3.96 | | YES | ignore |
| Partial List Indicator NR | O | | Partial List Indicator 9.2.2.46 | Value "partial" indicates that a partial list of cells is included in the List of Served Cells NR IE. | YES | ignore |

-continued

| IE/Group Name | Presence | Range | IE type and reference | Semantics description | Criticality | Assigned Criticality |
|---|---|---|---|---|---|---|
| Cell and Capacity Assistance Information NR | O | | 9.2.2.41 | Contains NR cell related assistance information. | YES | ignore |
| Partial List Indicator E-UTRA | O | | Partial List Indicator 9.2.2.46 | Value "partial" indicates that a partial list of cells is included in the List of Served Cells E-UTRA | YES | ignore |
| Cell and Capacity Assistance Information E-UTRA | O | | 9.2.2.42 | Contains E-UTRA cell related assistance information | YES | ignore |
| Inactive Security Key | O | | 9.2.3.yyy | | YES | ignore |

| Range bound | Explanation |
|---|---|
| maxnoofCellsinNG-RAN node | Maximum no. cells that can be served by a NG-RAN node. Value is 16384. |

Xn Setup Response

In some embodiments, the XN SETUP RESPONSE message may be sent by a second network node to a neighboring first network node to transfer application data for an Xn-C interface instance. The message may be sent as a response to the XN SETUP REQUEST message and is exemplified below.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.3.3 | | YES | reject |
| TAI Support List | M | | 9.2.3.20 | List of supported TAs and associated characteristics. | YES | reject |
| List of Served Cells NR | | 0 .. <maxnoofCellsinNG-RAD node> | | Contains a list of cells served by the gNB. If a partial list of cells is signalled, it contains at least one cell per carrier configured at the gNB | YES | reject |
| >Served Cell Information NR | M | | 9.2.2.11 | | — | |
| >Neighbour Information 1NR | O | | 9.2.2.13 | | — | |
| >Neighbour Information E-UTRA | O | | 9.2.2.14 | | — | |
| List of Served Cells E-UTRA | | 0 .. <maxnoofCellsinNG-RAN node. | | Contains a list of celle served by the ng-eNB. If a partial list of cells is signalled, it contains at least one cell per carrier configured at the gNB | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| Criticality Diagnostics | O | | 9.2.3.3 | | YES | ignore |
| AMF Region Information | O | | 9.2.3.83 | Contains a list of all the AMF Regions to which the NG-RAN node belongs. | YES | reject |

-continued

| | | | | | |
|---|---|---|---|---|---|
| Interface Instance Indication | O | | 9.2.2.39 | YES | reject |
| TNL Configuration Info | O | | 9.2.3.96 | YES | ignore |
| Partial List Indicator NR | O | | Partial List Indicator 9.2.2.46 | Value "partial" indicates that a partial list of cells is included in the List of Served Cells NR IE. | YES | ignore |
| Partial List Indicator E-UTRA | O | | Partial List Indicator 9.2.2.46 | Value "partial" indicates that a partial list of cells is included in the List of Served Cells E-UTRA | YES | ignore |
| Cell and Capacity Assistance Information E-UTRA | O | | 9.2.2.42 | Contains E-UTRA cell related assistance information. | YES | ignore |
| Inactive Security Key | O | | 9.2.3.yyy | | YES | ignore |

| Range bound | Explanation |
|---|---|
| maxnoofCellsinNG-RAN node | Maximum no. cells that can be served by a NG-RAN node. Value is 16384 |

NG-RAN Node Configuration Update

In some embodiments, the NG-RAN NODE CONFIGURATION UPDATE message is exemplified below and may be sent by a first network node to a second neighboring network node to transfer updated information for an Xn-C interface instance.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| TAI Support List | O | | 9.2.3.20 | List of supported TAs and associated characteristics. | GLOBAL | reject |
| CHOICE Initiating NodeType | M | | | | YES | ignore |
| >gNB | | | | | | |
| >>Served Cells To Update NR | O | | 9.2.2.15 | | YES | ignore |
| >>Cell Assistance Information NR | O | | 9.2.2.17 | | YES | ignore |
| >>Cell Assistance Information E-UTRA | O | | 9.2.2.43 | | YES | ignore |
| >>ng-eNB | | | | | | |
| >>Served Cells to Update E-UTRA | O | | 9.2.2.18 | | YES | ignore |
| >>Cell Assistance Information NR | O | | 9.2.2.17 | | YES | ignore |
| >>Cell Assistance Information E-UTRA | O | | 9.2.2.43 | | YES | ignore |
| TNLA To Add List | | 0..1 | | | YES | ignore |
| >TNLA To Add Item | | 1..<maxnoofTNLAssociations> | | | — | |
| >>TNLA Transport Layer Information | M | | CP Transport Layer 9.2.3.31 | CP Transport Layer information of NG-RAN node. | — | |
| >> TNL Association Usage | M | | 9.2.3.84 | | — | |
| TNLA To Update List | | 0..1 | | | YES | ignore |
| >TNLA To Update Item | | 1..<maxnoofTNLAssociations> | | | — | |
| >>TNLA Transport Layer Information | M | | CP Transport Layer 9.2.3.31 | CP Transport Layer Information of NG-RAN node. | — | |
| >> TNL Association Usage | O | | 9.2.3.84 | | — | |
| TNLA To Remove List | | 0..1 | | | YES | ignore |
| >TNLA To Remove Item | | 1..<maxnoofTNLAssociations> | | | — | |
| >>TNLA Transport Layer Information | M | | CP Transport Layer Information 9.2.3.31 | CP Transport Layer Information of NG-RAN node. | — | |

| | | | | | |
|---|---|---|---|---|---|
| Global NG-RAN Node ID | O | | 9.2.2.3 | | YES reject |
| AMF Region Information To Add | O | | AMF Region Information 9.2.3.83 | List of all added AMF Regions to which the NG-RAN node belongs. | YES reject |
| AMF Region Information To Delete | O | | AMF Region Information 9.2.3.83 | List of all deleted AMF Regions to which the NG-RAN rode belongs. | YES reject |
| Interface Instance Indication | O | | 9.2.2.39 | | YES reject |
| TNL Configuration Info | O | | 9.2.3.96 | | YES Ignore |
| Inactive Security Key | O | | 9.2.3.yyy | | YES ignore |

| Range bound | Explanation |
|---|---|
| maxnoofTNLAssociations | Maximum numbers of TNL Associations between the NG RAN nodes. Value is 32. |

NG-RAN Node Configuration Update Acknowledge

In some embodiments, the NG-RAN NODE CONFIGURATION UPDATE ACKNOWLEDGE message may be sent by a first neighboring NG-RAN node to a second network node, e.g. peer node, to acknowledge update of information for a Transport Network Layer, TNL, association.

The message may be sent as a response to the NG-RAN NODE CONFIGURATION UPDATE message and is exemplified below.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| CHOICE Responding NodeType | M | | | | YES | ignore |
| >ng-eNB | | | | | | |
| >gNB | | | | | | |
| >>Served NR Cells | | 0_ <maxnoof/CellsinNG-RANnode> | | Complete or limited list of cells served by a gNB, if requested by an NG-RAN node. | — | |
| >>>Served Cell Information NR | M | | 9.2.2.11 | | — | |
| >>>Neighbour Information NR | O | | 9.2.2.13 | NR neighbours. | — | |
| >>>Neighbour Information E-UTRA | O | | 9.2.2.14 | E-UTRA neighbours | — | |
| >>Partial List Indicator NR | O | | Partial List Indicator 9.2.2.46 | Value "partial" indicates that a partial list of cells is included in the Served NR Cells IE | YES | ignore |
| >>Cell and Capacity Assistance Information NR | O | | 9.2.2.41 | Contains NR cell related assistance information | YES | ignore |
| TNLA Setup List | | 0..1 | | | YES | ignore |
| >TNLA Setup Item | | 1..<maxnoofTNLAssociations> | | | — | |
| >>TNLA Transport Layer Address | M | | CP Transport Layer Information 9.2.3.31 | CP Transport Layer Information as received from NG-RAN node. | — | |
| TNLA Failed to Setup Lis | | 0..1 | | | YES | ignore |
| >TNLA Failed To Setup Item | | 1..<maxnoofTNLAssociations> | | | — | |
| >>TNLA Transport Layer Address | M | | CP Transport Layer Information 9.2.3.31 | CP Transport Layer Information as received from NG-RAN node. | — | |

-continued

| | | | | | |
|---|---|---|---|---|---|
| >>Cause | M | | 9.2.3.2 | — | |
| Critically Diagnostics | O | | 9.2.3.3 | YES | ignore |
| Interface Instance Indication | O | | 9.2.2.39 | YES | reject |
| TNL Configuration Into | O | | 9.2.3.96 | YES | Ignore |
| Inactive Security Key | O | | 9.2.3.yyy | YES | ignore |

| Range bound | Explanation |
|---|---|
| maxnoofCellsinNGRANnode | Maximum no. cells that can be served by an NG-RAN node. Value is 16384. |
| maxnoofTNLAssociations | Maximum numbers of TNL Associations between NG-RAN nodes. Value is 32. |

Inactive Security Key

In some embodiments, similar to NGAP, the inactive security key IE may be used to apply security for wireless terminals, e.g. the wireless terminal 120, in RRC_INACTIVE state in the NG-RAN. The scenarios may further be defined in TS 33.501. The inactive security key IE is exemplified below.

| IE/Group Name | Presence | Range | IE type and reference | Semantics description |
|---|---|---|---|---|
| Inactive Security Key | M | | BIT STRING (SIZE(256)) | Key material for NG-RAN node as defined in TS 33.501 [13] |

Adaptations Examples

In this section follows below, an example of possible adaptations to 3GPP TS 33.501, Security architecture and procedures for 5G system, in order to incorporate embodiments herein. In the below adaptations examples, the first network node may refer to the source network node 111 and the second network node may refer to the target network node 112.

Xn Setup

In some embodiments, during the Xn setup procedure, the second network node, may receive from the first network node, an inactive security key to be used by the first network node for subsequent handling of users in RRC_INACTIVE.

In some embodiments, during the Xn setup procedure, the first network node may receive from the second network node, an inactive security key to be used by the second network node for subsequent handling of users in RRC_INACTIVE.

NG-RAN Configuration Update

In some embodiments, during the NG-RAN configuration update procedure, the second network node may receive from the first network node, an inactive security key to be used by the first network node for subsequent handling of users in RRC_INACTIVE.

In some embodiments, during the NG-RAN configuration update procedure, the first network node may receive from the second network node, an inactive security key to be used by the second network node for subsequent handling of users in RRC_INACTIVE.

NG Setup

In some embodiments, during the NG setup procedure, the first or second network node may receive from the AMF an inactive security key to be used by the first or second network node for subsequent handling of users in RRC_INACTIVE.

AMF Configuration Update

In some embodiments, during the AMF configuration update procedure, the first or second network node may receive from the AMF an inactive security key to be used by the first or second network node for subsequent handling of users in RRC_INACTIVE.

The inactive security key used above may in some embodiments be the concealed resume identifier, e.g. concealed I-RNTI.

Figure 8A:
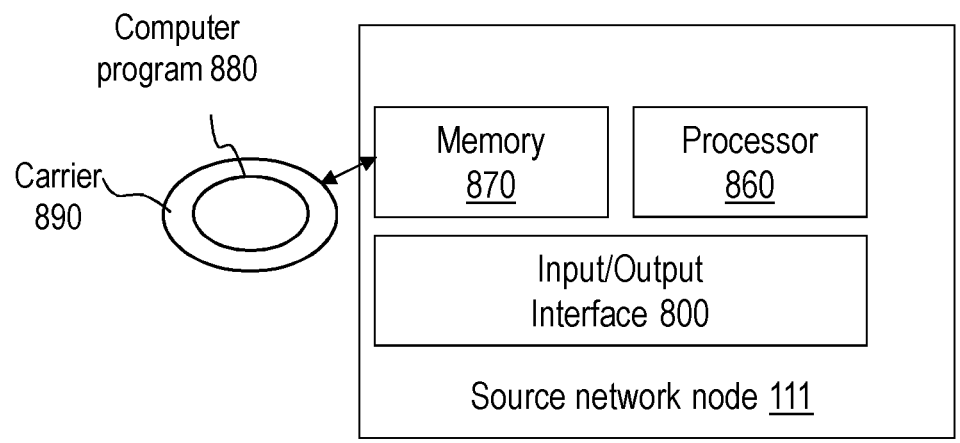
FIGS. 8 *a* and *b* are schematic block diagrams illustrating embodiments of a source network node.
Figure 8B:
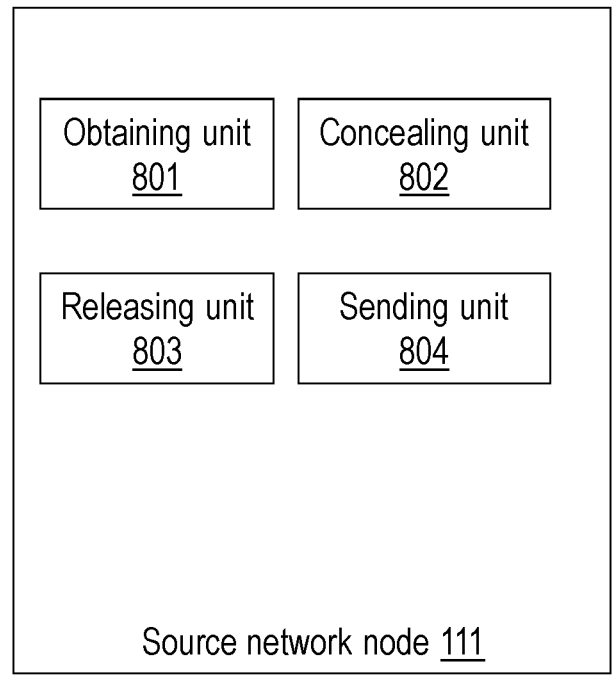

To perform the method actions above, the source network node 111 may comprise an arrangement depicted in FIGS. 8a and 8b. The source network node 111 is configured to prevent agents from illegitimately identifying the source network node 111 when resuming the wireless terminal 120 in the target network node 112 in the wireless communications network 100.

The network node 111 may comprise an input and output interface 800 configured to communicate with network entities such as the target network node 112 or the wireless terminal 120. The communication interface may comprise a wireless receiver (not shown) and a wireless transmitter (not shown).

The source network node 111 may further be configured to, e.g. by means of an obtaining unit 801 in the source network node 111, obtain a concealing key, which concealing key is adapted to be shared with the target network node 112.

The source network node 111 may further be configured to, e.g. by means of the obtaining unit 801 in the source network node 111, obtain the concealing key by any one out of:
  generating the concealing key and sending the concealing key to the target network node 112,
  receiving the concealing key from a network node,
  receiving the concealing key from a network node Access and Mobility Management Function, AMF,
  receiving the concealing key from a network node Operations, Administration and Maintenance, OAM, or
  receiving the concealing key from the target network node 112.

The source network node 111 may further be configured to, e.g. by means of a concealing unit 802 in the source network node 111, conceal a resume identifier with the obtained concealing key, which resume identifier is adapted to identify the source network node 111.

The concealed resume identifier to be sent by the wireless terminal 120 to the target network node 112 upon requesting resumption of the wireless terminal 120 is adapted to enable the target network node 112 to decode the concealed resume identifier with the shared concealing key to identify the source network node 111, which source network node 111 identity is adapted to be used when resuming the wireless terminal 120 in the target network node 112.

The source network node 111 identity may be arranged to be used by the target network node 112 to address a request for retrieving the UE context of the wireless terminal 120, adapted to be used when resuming the wireless terminal 120 in the target network node 112.

The concealing key may be adapted to be represented by an encryption key, and wherein the source network node 111 further is configured to:, e.g. by means of the concealing unit 802, conceal the resume identifier with the obtained concealing key by encrypting the resume identifier with the obtained encryption key.

The concealing key may be adapted to be represented by a vector, wherein the source network node 111 further is configured to, e.g. by means of the concealing unit 802, conceal the resume identifier with the obtained concealing key by scrambling the resume identifier with the obtained vector.

The concealing key may be adapted to be represented by an encryption key and a vector, wherein the source network node 111 further is configured to, e.g. by means of the concealing unit 802, conceal the resume identifier with the obtained concealing key by encrypting and scrambling the resume identifier with the obtained encryption key and vector.

The resume identifier may be adapted to comprise a source node identifier, which source node identifier is adapted to identify the source network node 111, and wherein the source network node 111 further is configured to, e.g. by means of the concealing unit 802, conceal the resume identifier by concealing the source node identifier with the obtained concealing key.

The resume identifier may be represented by an I-RNTI.

The source network node 111 may further be configured to, e.g. by means of a releasing unit 803, in the source network node 111, release the wireless terminal 120.

The source network node 111 may further be configured to, e.g. by means of a sending unit 804, in the source network node 111, when releasing the wireless terminal 120, send the concealed resume identifier to the wireless terminal 120, which concealed resume identifier is to be sent by the wireless terminal 120 to the target network node 112 upon requesting resumption of the wireless terminal 120. The resume identifier is adapted to only be identifiable from the concealed resume identifier by using the shared concealing key, thereby preventing agents from illegitimately learning the source network node 111 identity.

The source network node 111 may be adapted to possess, e.g. host, a UE context of the wireless terminal 120, and wherein concealed resume identifier to be sent to the wireless terminal 120, e.g. by means of the sending unit 804, further prevents agents from illegitimately retrieving the possessed UE context.

The Radio Access Technology, RAT, to be used by the source network node 111, may be a 5G NR, of 3GPP.

The embodiments herein may be implemented through a respective processor or one or more processors, such as the processor 860 of a processing circuitry in the source network node 111 depicted in FIG. 8a, together with respective computer program code for performing the functions and actions of the embodiments herein. The program code mentioned above may also be provided as a computer program product, for instance in the form of a data carrier carrying computer program code for performing the embodiments herein when being loaded into the source network node 111. One such carrier may be in the form of a CD ROM disc. It is however feasible with other data carriers such as a memory stick. The computer program code may furthermore be provided as pure program code on a server and downloaded to source network node 111.

The source network node 111 may further comprise a memory 870 comprising one or more memory units. The memory 870 comprises instructions executable by the processor in source network node 111. The memory 870 is arranged to be used to store e.g. information, indications, data, configurations, and applications to perform the methods herein when being executed in the source network node 111.

In some embodiments, a computer program 880 comprises instructions, which when executed by the respective at least one processor 860, cause the at least one processor of the source network node 111 to perform the actions above.

In some embodiments, a respective carrier 890 comprises the respective computer program 880, wherein the carrier 890 is one of an electronic signal, an optical signal, an electromagnetic signal, a magnetic signal, an electric signal, a radio signal, a microwave signal, or a computer-readable storage medium.

Those skilled in the art will appreciate that the units in the source network node 111 described above may refer to a combination of analog and digital circuits, and/or one or more processors configured with software and/or firmware, e.g. stored in the source network node 111, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

To perform the method actions above, the target network node 112 configured to prevent agents from illegitimately identifying the source network node 111 when resuming the wireless terminal 120 in the target network node 112 in the wireless communications network 100. The target network node 112 may comprise an arrangement depicted in FIGS. 9a and 9b.

The target network node 112 may comprise an input and output interface 900 configured to communicate with network entities such as the source network node 111 or the wireless terminal 120. The input and output interface 900 may comprise a wireless receiver (not shown) and a wireless transmitter (not shown).

The target network node 112 may further be configured to, e.g. by means of a obtaining unit 901 in the target network node 112, to obtain a concealing key, which concealing key is adapted to be shared with the source network node 111.

The target network node 112 may further be configured to, e.g. by means of the obtaining unit 901, to obtain the concealing key, by any one out of:
  generating the concealing key and sending the concealing key to the source network node 111,
  receiving the concealing key from a network node,
  receiving the concealing key from a network node AMF, receiving the concealing key from a network node OAM, or receiving the concealing key from the source network node 111.

The target network node 112 may further be configured to, e.g. by means of a receiving unit 902 in the target network node 112, to receive from the wireless terminal 120, a resume request and a concealed resume identifier, which concealed resume identifier is adapted to be a resume identifier concealed by the source network node 111 using the shared concealing key, and which resume identifier is adapted to identify the source network node 111. The resume identifier is adapted to only be identifiable from the concealed resume identifier by using the shared concealing key, thereby preventing agents from illegitimately learning the source network node 111 identity when resuming the wireless terminal 120 in the target network node 112.

The source network node 111 may be arranged to possess a UE context of the wireless terminal 120, and wherein the concealed resume identifier, e.g. by means of the receiving unit 902, to be received from the wireless terminal 120, further is arranged to prevent agents from illegitimately retrieving the possessed UE context.

The resume identifier may be adapted to comprise a source node identifier, which source node identifier is adapted to identify the source network node 111, and wherein the concealed resume identifier is adapted to comprise a concealed source node identifier concealed by the source network node 111 with the concealing key.

The resume identifier is adapted to be represented by I-RNTI.

The target network node 112 may further be configured to, e.g. by means of a identifying unit 903 in the target network node 112, to identify the source network node 111 by decoding the concealed resume identifier with the shared concealing key.

The concealing key may be adapted to be represented by an encryption key, and wherein the concealed resume identifier is adapted to be the resume identifier encrypted by the source network node 111, encrypted with the encryption key.

The concealing key may be adapted to be represented by a vector, and wherein the concealed resume identifier is adapted to be the resume identifier scrambled by the source network node 111, scrambled with the vector.

The concealing key is adapted to be represented by an encryption key and a vector, and wherein the concealed resume identifier is adapted to be the resume identifier encrypted and scrambled by the source network node 111, encrypted and scrambled with the encryption key and vector.

The target network node 112 may further be configured to, e.g. by means of a resuming unit 904 in the target network node 112, to resume the wireless terminal 120 in the target network node 112 by using the identity of the source network node 111.

The target network node 112 may further be configured to, e.g. by means of a requesting unit 905 in the target network node 112, to request from the identified source network node 111, the UE context of the wireless terminal 120, receive, e.g. by means of the receiving unit 902, from the identified source network node 111, the requested UE context, and resume, e.g. by means of the resuming unit 904, the wireless terminal 120 in the target network node 112, based on the received UE context.

The RAT to be used by the target network node 112 may be adapted to be 5G NR of 3GPP.

Figure 9A:
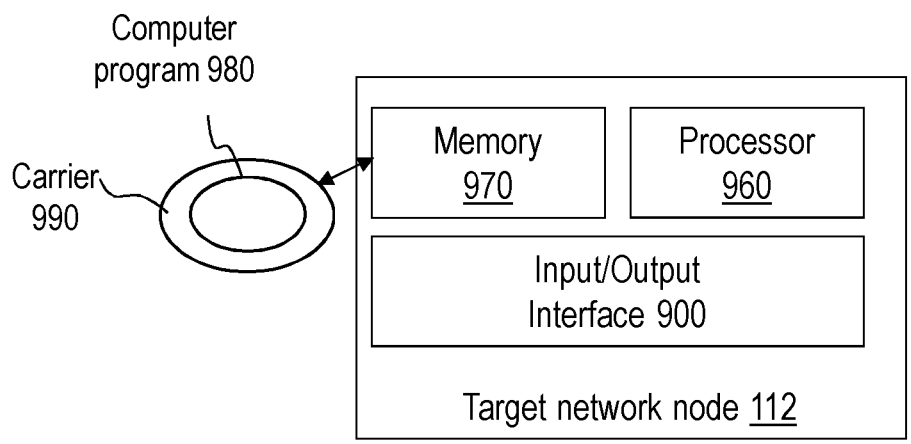
FIGS. 9 *a* and *b* are schematic block diagrams illustrating embodiments of a target network node.
Figure 9B:
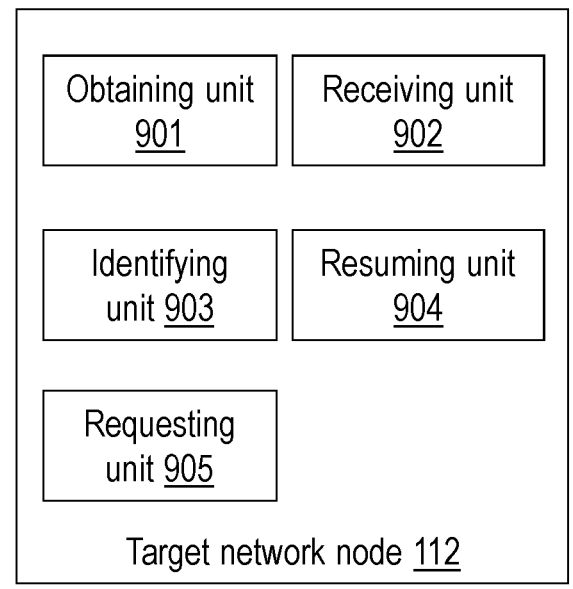

The embodiments herein may be implemented through a respective processor or one or more processors, such as the processor 960 of a processing circuitry in the target network node 112 depicted in FIG. 9a, together with respective computer program code for performing the functions and actions of the embodiments herein. The program code mentioned above may also be provided as a computer program product, for instance in the form of a data carrier carrying computer program code for performing the embodiments herein when being loaded into the target network node 112. One such carrier may be in the form of a CD ROM disc. It is however feasible with other data carriers such as a memory stick. The computer program code may furthermore be provided as pure program code on a server and downloaded to the target network node 112.

The target network node 112 may further comprise a memory 970 comprising one or more memory units. The memory 970 comprises instructions executable by the processor in target network node 112. The memory 970 is arranged to be used to store e.g. information, indications, data, configurations, and applications to perform the methods herein when being executed in the target network node 112.

In some embodiments, a computer program 980 comprises instructions, which when executed by the respective at least one processor 960, cause the at least one processor of the target network node 112 to perform the actions above.

In some embodiments, a respective carrier 990 comprises the respective computer program 980, wherein the carrier 990 is one of an electronic signal, an optical signal, an electromagnetic signal, a magnetic signal, an electric signal, a radio signal, a microwave signal, or a computer-readable storage medium.

Those skilled in the art will appreciate that the units in the target network node 112 described above may refer to a combination of analog and digital circuits, and/or one or more processors configured with software and/or firmware, e.g. stored in the target network node 112, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 10:
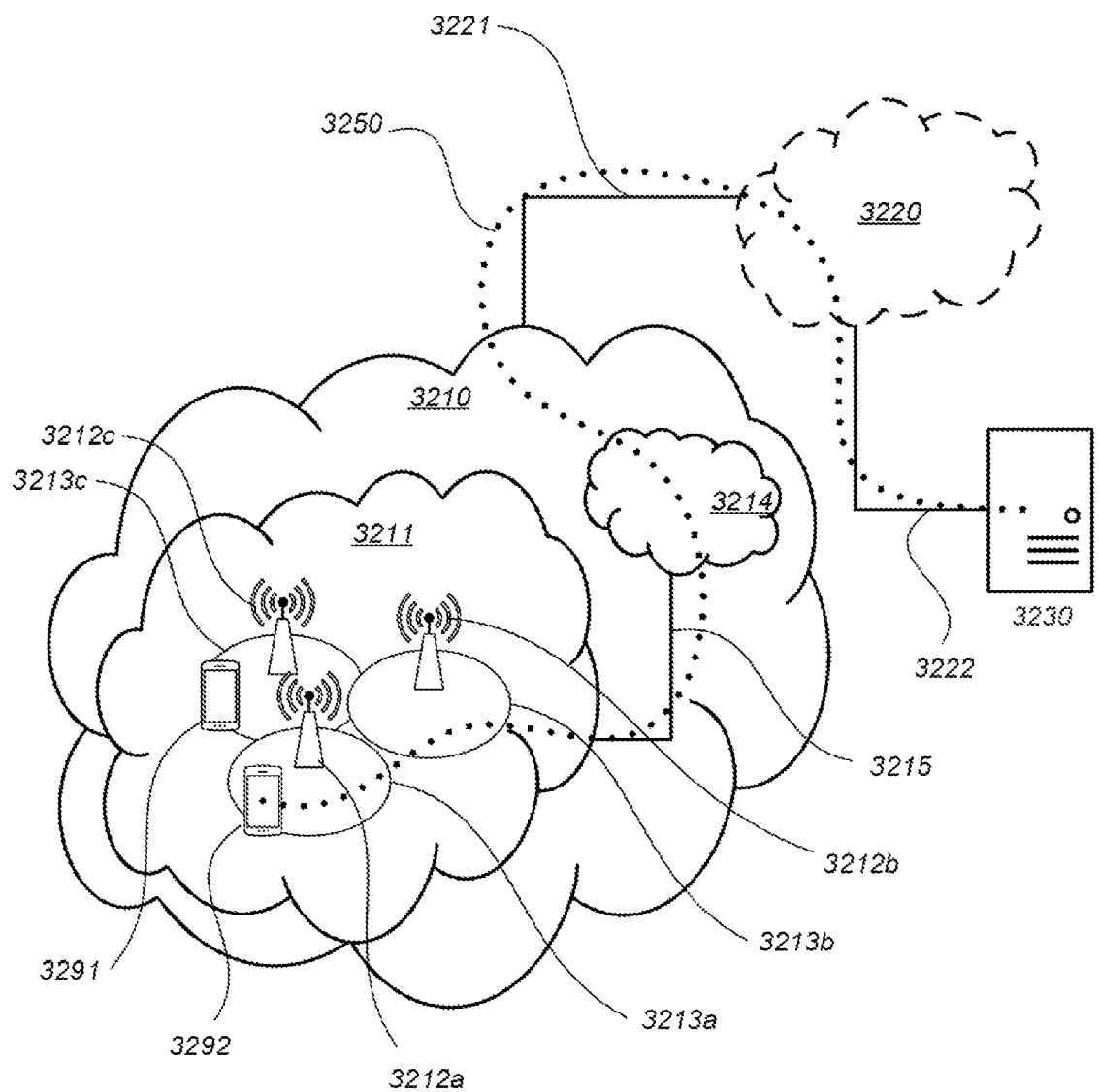
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, e.g. the wireless communication network 100, which comprises an access network 3211, such as a radio access network, and a core network 3214. The access network 3211 comprises a plurality of base stations 3212a, 3212b, 3212c, such as AP STAs NBs, eNBs, gNBs, e.g. the source network node 111 or target network node 112, or other types of wireless access points, each defining a corresponding coverage area 3213a, 3213b, 3213c. Each base station 3212a, 3212b, 3212c is connectable to the core network 3214 over a wired or wireless connection 3215. A first user equipment such as a Non-AP STA 3291 or e.g. the wireless terminal 120 located in coverage area 3213c is configured to wirelessly connect to, or be paged by, the corresponding base station 3212c. A second UE 3292 such as a Non-AP STA e.g. the wireless terminal 120 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

Figure 11:
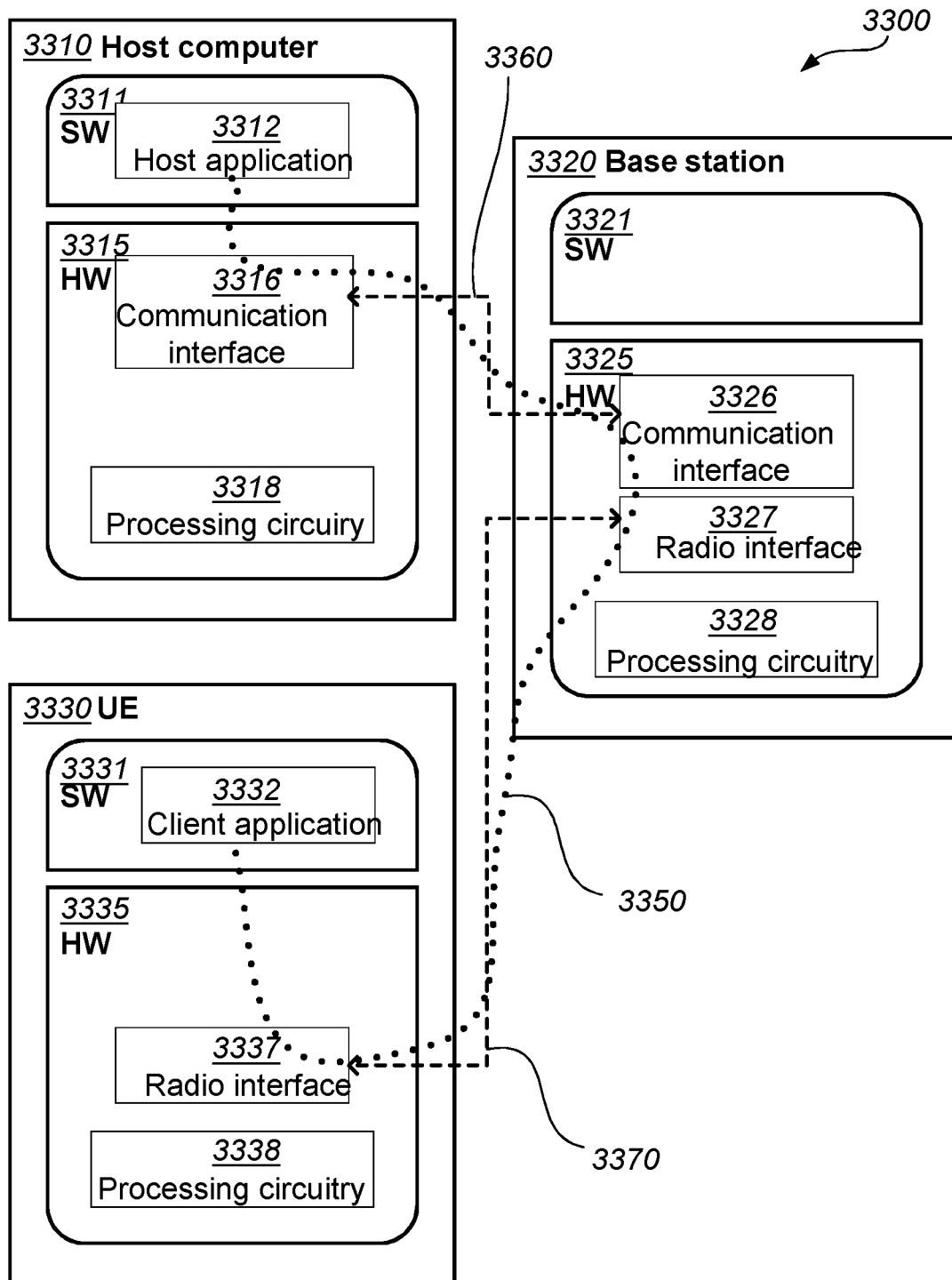
FIG. 11 is a generalized block diagram of a host computer communicating via a base station with a user equipment over a partially wireless connection.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the integrity of network identifiers, and thereby provide benefits such as, better security.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 12, 13:
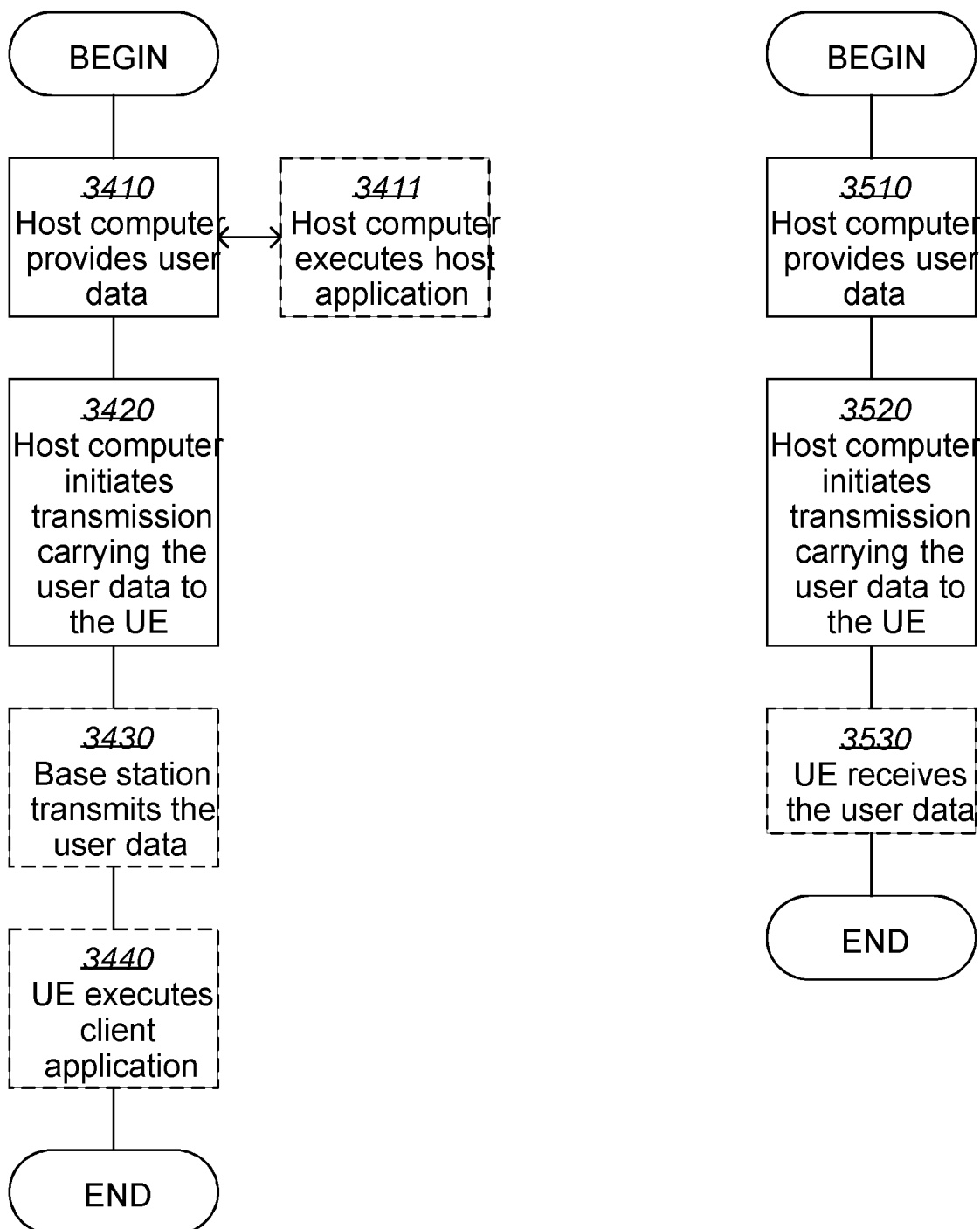
FIGS. 12-15 are flowcharts illustrating methods implemented in a communication system including a host computer, a base station and a user equipment.

FIG. 12 is a flowchart illustrating a method implemented in a communication system, in accordance with one embodiment. The communication system includes a host computer, a base station such as an AP STA, and a UE such as a Non-AP STA which may be those described with reference to FIG. 10 and FIG. 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 13 is a flowchart illustrating a method implemented in a communication system, in accordance with one embodiment. The communication system includes a host computer, a base station such as an AP STA, and a UE such as a Non-AP STA which may be those described with reference to FIG. 10 and FIG. 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 14:
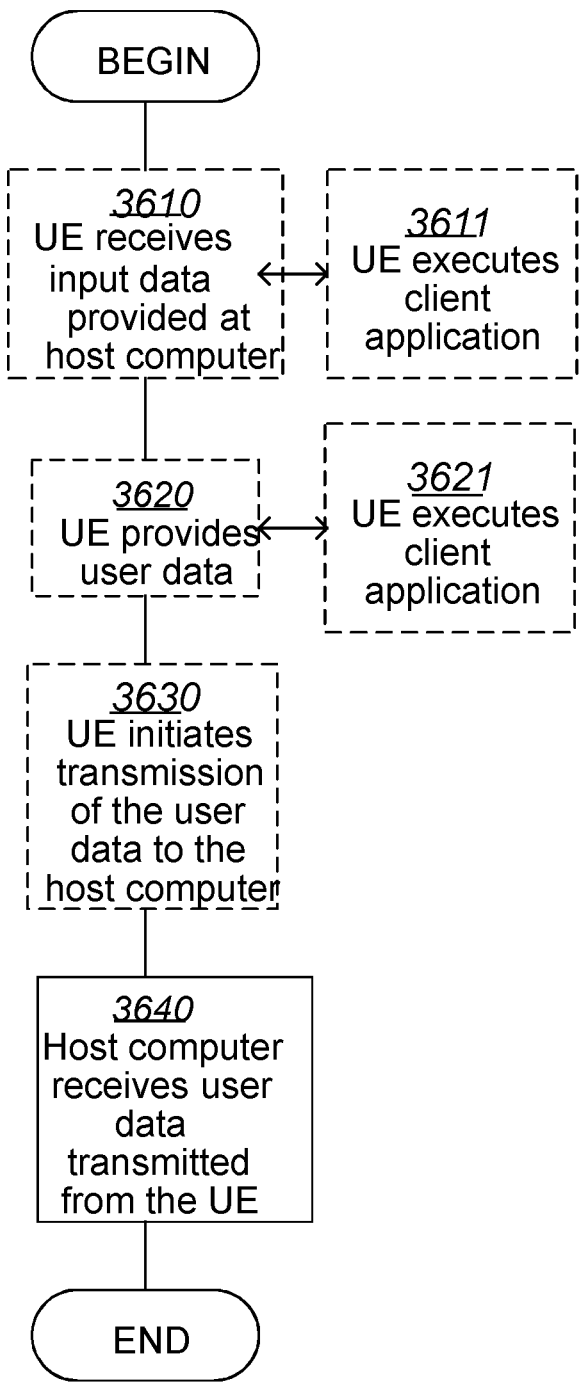

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 10 and FIG. 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 15:
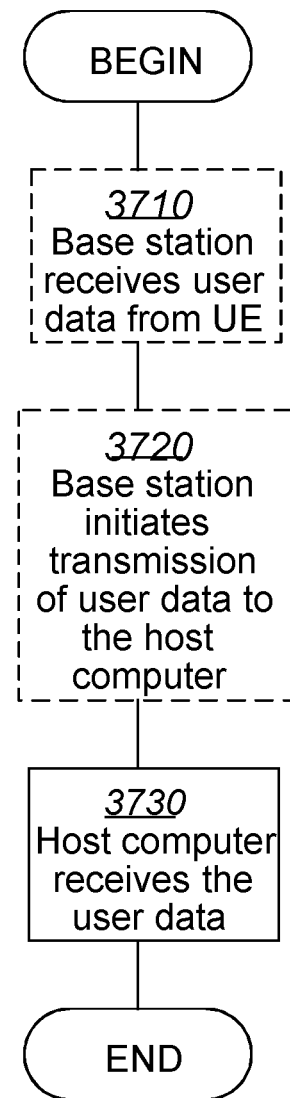

FIG. 15 is a flowchart illustrating a method implemented in a communication system, in accordance with one embodiment. The communication system includes a host computer, a base station such as an AP STA, and a UE such as a Non-AP STA which may be those described with reference to FIG. 10 and FIG. 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method performed by a source network node for preventing agents from illegitimately identifying the source network node when releasing a wireless terminal and resuming a connection for the wireless terminal in a target network node in a wireless communications network, the method comprising:

obtaining a concealing key, which concealing key is shared with the target network node;

concealing a resume identifier with the obtained concealing key, which resume identifier identifies the source network node;

releasing the wireless terminal;

when releasing the wireless terminal, sending the concealed resume identifier to the wireless terminal, which concealed resume identifier is to be sent by the wireless terminal to the target network node upon requesting resumption of the wireless terminal; and the resume identifier only being identifiable from the concealed resume identifier by using the shared concealing key to prevent agents from illegitimately learning the source network node identity.

2. The method according to claim 1, wherein the source network node possesses a UE context of the wireless terminal, and wherein the concealed resume identifier is sent to the wireless terminal, further preventing agents from illegitimately retrieving the possessed UE context.

3. The method according to claim 1, wherein the concealed resume identifier to be sent by the wireless terminal to the target network node upon requesting resumption of the wireless terminal enables the target network node to decode the concealed resume identifier with the shared concealing key to identify the source network node, which source network node identity is to be used when resuming the wireless terminal in the target network node.

4. The method according to claim 3, wherein the source network node identity is to be used by the target network node to address a request for retrieving a UE context of the wireless terminal to be used when resuming the wireless terminal in the target network node.

5. The method according to claim 1, wherein the concealing key is represented by an encryption key, and wherein concealing the resume identifier with the obtained concealing key is performed by encrypting the resume identifier with the encryption key.

6. The method according to claim 1, wherein the concealing key is represented by a vector, and wherein concealing the resume identifier with the obtained concealing key is performed by scrambling the resume identifier with the vector.

7. The method according to claim 1, wherein the concealing key is represented by an encryption key and a vector, and wherein concealing the resume identifier with the obtained concealing key is performed by encrypting and scrambling the resume identifier with the encryption key and vector.

8. The method according to claim 1, wherein the resume identifier comprises a source node identifier, which source node identifier identifies the source network node, and wherein concealing the resume identifier comprises concealing the source node identifier with the obtained concealing key.

9. The method according to claim 1, wherein the resume identifier is represented by an Inactive-Radio Network Temporary Identifier, I-RNTI.

10. The method according to claim 1, wherein obtaining the concealing key comprises any one of:
generating the concealing key and sending the concealing key to the target network node;
receiving the concealing key from a network node;
receiving the concealing key from a network node Access and Mobility Management Function, AMF;
receiving the concealing key from a Operations, Administration and Maintenance, OAM, node; or
receiving the concealing key from the target network node.

11. A method performed by a target network node for preventing agents from illegitimately identifying a source network node when releasing a wireless terminal and resuming a connection for the wireless terminal in the target network node in a wireless communications network, the method comprising:
obtaining a concealing key, which concealing key is shared with the source network node;
receiving, from the wireless terminal that was released by the source network node, a resume request and a concealed resume identifier, which concealed resume identifier is a resume identifier concealed by the source network node using the shared concealing key, and which resume identifier identifies the source network node;
the resume identifier only being identifiable from the concealed resume identifier by using the shared concealing key, to prevent agents from illegitimately learning the source network node identity when resuming the wireless terminal in the target network node;
identifying the source network node by decoding the concealed resume identifier with the shared concealing key; and
resuming the wireless terminal in the target network node by using the identity of the source network node.

12. The method according to claim 11, wherein the source network node possesses a UE context of the wireless terminal, and wherein the concealed resume identifier received from the wireless terminal, further preventing agents from illegitimately retrieving the possessed UE context.

13. The method according to claim 12 further comprising:
requesting from the identified source network node, the UE context of the wireless terminal;
receiving from the identified source network node, the requested UE context; and
resuming the wireless terminal in the target network node, based on the received UE context.

14. The method according to claim 11, wherein the concealing key is represented by an encryption key, and wherein the concealed resume identifier is the resume identifier encrypted by the source network node, encrypted with the encryption key.

15. The method according to claim 11, wherein the concealing key is represented by a vector, and wherein the concealed resume identifier is the resume identifier scrambled by the source network node, scrambled with the vector.

16. The method according to claim 11, wherein the concealing key is represented by an encryption key and a vector, and wherein the concealed resume identifier is the resume identifier encrypted and scrambled by the source network node, encrypted and scrambled with the encryption key and vector.

17. The method according to claim 11, wherein the resume identifier comprises a source node identifier, which source node identifier identifies the source network node, and wherein the concealed resume identifier comprises a concealed source node identifier concealed by the source network node, concealed with the concealing key.

18. The method according to claim 11, wherein the resume identifier is represented by an Inactive-Radio Network Temporary Identifier, I-RNTI.

19. The method according to claim 11, wherein obtaining the concealing key, is performed by any one of:
generating the concealing key and sending the concealing key to the source network node;
receiving the concealing key from a network node;
receiving the concealing key from a network node Access and Mobility Management Function (AMF);

receiving the concealing key from a Operations, Administration and Maintenance (OAM) node; or receiving the concealing key from the source network node.

20. A source network node configured to prevent agents from illegitimately identifying the source network node when releasing a wireless terminal and resuming a connection for the wireless terminal in a target network node in a wireless communications network, the source network node being further configured to:

obtain a concealing key, which concealing key is adapted to be shared with the target network node;

conceal a resume identifier with the obtained concealing key, which resume identifier is adapted to identify the source network node;

release the wireless terminal;

when releasing the wireless terminal, the source network node is configured to send the concealed resume identifier to the wireless terminal, which concealed resume identifier is to be sent by the wireless terminal to the target network node upon requesting resumption of the wireless terminal; and the resume identifier being adapted to only be identifiable from the concealed resume identifier by using the shared concealing key to prevent agents from illegitimately learning the source network node identity.

\* \* \* \* \*